US012574815B2

(12) United States Patent
Wu et al.

(10) Patent No.: US 12,574,815 B2
(45) Date of Patent: Mar. 10, 2026

(54) MANAGING CONFIGURATIONS

(71) Applicant: GOOGLE LLC, Mountain View, CA (US)

(72) Inventors: Chih-Hsiang Wu, Taoyuan City (TW); Teming Chen, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 653 days.

(21) Appl. No.: 17/926,561

(22) PCT Filed: May 19, 2021

(86) PCT No.: PCT/US2021/033137
§ 371 (c)(1),
(2) Date: Nov. 18, 2022

(87) PCT Pub. No.: WO2021/236755
PCT Pub. Date: Nov. 25, 2021

(65) Prior Publication Data
US 2023/0199579 A1 Jun. 22, 2023

Related U.S. Application Data

(60) Provisional application No. 63/080,835, filed on Sep. 21, 2020, provisional application No. 63/028,421, filed on May 21, 2020.

(51) Int. Cl.
*H04W 36/00* (2009.01)
*H04W 36/18* (2009.01)
(Continued)

(52) U.S. Cl.
CPC . *H04W 36/0079* (2018.08); *H04W 36/00698* (2023.05); *H04W 36/03* (2018.08);
(Continued)

(58) Field of Classification Search
CPC ............ H04W 36/0079; H04W 36/03; H04W 36/305; H04W 36/00698; H04W 36/362; H04W 36/185; H04W 36/087
See application file for complete search history.

(56) References Cited

U.S. PATENT DOCUMENTS 11,683,733 B2 * 6/2023 Jang .................. H04W 36/0079
370/331
12,336,030 B2 * 6/2025 Kim ...................... H04W 76/15
(Continued)

FOREIGN PATENT DOCUMENTS

WO WO-2017/171598 A1 10/2017
WO WO-2018/232245 A1 12/2018
(Continued)

OTHER PUBLICATIONS

International Search Report and Written Opinion for Application No. PCT/US2021/033137, dated Sep. 16, 2021.
(Continued)

*Primary Examiner* — Michael J Moore, Jr.
(74) *Attorney, Agent, or Firm* — MARSHALL, GERSTEIN & BORUN LLP

(57) ABSTRACT

To manage a power coordination configuration when performing a dual active protocol stack (DAPS) procedure, a UE receives (702A), from a radio access network (RAN), a power coordination configuration for application by the UE to constrain uplink power when communicating with a source cell and a target cell of the RAN, initiates (704A) the DAPS procedure in accordance with the power coordination configuration, and in response to detecting a trigger condition, releases (706A) the power coordination configuration.

16 Claims, 9 Drawing Sheets

(51) Int. Cl.
  *H04W 36/30* (2009.01)
  *H04W 36/36* (2009.01)
  *H04W 36/08* (2009.01)

(52) U.S. Cl.
  CPC ....... *H04W 36/185* (2023.05); *H04W 36/305* (2018.08); *H04W 36/362* (2023.05); *H04W 36/087* (2023.05)

(56) References Cited

U.S. PATENT DOCUMENTS

| | | | | |
|---|---|---|---|---|
| 12,425,210 | B2 * | 9/2025 | You | H04L 9/0894 |
| 2018/0213450 | A1 | 7/2018 | Futaki et al. | |
| 2019/0380066 | A1 | 12/2019 | Sharma et al. | |
| 2020/0022035 | A1 * | 1/2020 | Kadiri | H04W 36/185 |
| 2020/0107236 | A1 | 4/2020 | Tseng et al. | |
| 2020/0314716 | A1 * | 10/2020 | Kim | H04W 36/0079 |
| 2021/0092654 | A1 * | 3/2021 | Kadiri | H04W 8/24 |
| 2021/0105671 | A1 | 4/2021 | Van Der Velde | |
| 2021/0211956 | A1 * | 7/2021 | Kim | H04W 12/043 |
| 2021/0306923 | A1 | 9/2021 | Ly | |
| 2022/0386204 | A1 * | 12/2022 | Parichehrehteroujeni | H04W 36/18 |
| 2022/0394802 | A1 * | 12/2022 | Zhang | H04W 36/0055 |
| 2023/0083266 | A1 * | 3/2023 | Wu | H04W 76/34 370/331 |
| 2023/0108496 | A1 * | 4/2023 | Ohlsson | H04W 36/185 370/329 |
| 2023/0171655 | A1 * | 6/2023 | Chen | H04W 36/00 370/331 |
| 2023/0180330 | A1 * | 6/2023 | Chang | H04W 76/19 370/329 |
| 2023/0189110 | A1 * | 6/2023 | Wu | H04W 36/185 370/331 |
| 2023/0199579 | A1 * | 6/2023 | Wu | H04W 36/00698 370/331 |
| 2024/0276207 | A1 * | 8/2024 | Abraham | H04W 8/18 |
| 2024/0334287 | A1 * | 10/2024 | Zhang | H04W 36/0033 |
| 2024/0430766 | A1 * | 12/2024 | Bettappanavar | H04W 76/20 |

FOREIGN PATENT DOCUMENTS

| | | | |
|---|---|---|---|
| WO | WO-2019/066628 A1 | 4/2019 | |
| WO | WO-2019/105074 A1 | 6/2019 | |
| WO | WO-2019/139962 A1 | 7/2019 | |
| WO | WO-2020226392 A1 * | 11/2020 | H04W 36/305 |
| WO | WO-2020/247369 A1 | 12/2020 | |

OTHER PUBLICATIONS

Qualcomm Incorporated et al., "UE Capability Coordination Signalling Aspects for DAPS HO," 3GPP Draft (2020).
Qualcomm Incorporation et al., "UE Capability Coordination Signalling Aspects for DAPS Based Enhanced MBB HO," 3GPP Draft (2019).
International Search Report and Written Opinion for Application No. PCT/US2021/033129, dated Sep. 13, 2021.
"3rd Generation Partnership Project; Technical Specification Group Radio Access Network; NR; Radio Resource Control (RRC)protocol specification (Release 16)", 3GPP Standard; Technical Specification (2020).
"3rd Generation Partnership Project; Technical Specification Group Radio Access Network; Evolved Universal Terrestrial Radio Access (E-UTRA); Radio Resource Control (RRC); Protocol specification (Release 16)", 3GPP Standard; Technical Specificatio (2020).
Google Inc, "Correction to DAPS handover", 3GPP Draft (2021).
Office Action for European Application No. 202180060819.5, dated Nov. 7, 2025.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.0.0 (2019).
"3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.0.0 (2019).
"3rd Generation Partnership Project; Technical Specification Group Radio Access Network; NG-RAN; Architecture description (Release 16)," 3GPP TS 38.401 V16.0.0 (2019).
"3rd Generation Partnership Project; Technical Specification Group Radio Access Network; NR; Packet Data Convergence Protocol (PDCP) specification (Release 16)," 3GPP TS 38.323 V16.0.0 (2020).
"3rd Generation Partnership Project; Technical Specification Group Radio Access Network; NR; Radio Resource Control (RRC) protocol specification (Release 15)," 3GPP TS 38.331 (2020).
"5G; NR; Overall Description; Stage-2," 3GPP TS 39.300 version 15.8.0 Release 15 (2020).
"LTE; Evolved Universal Terrestrial Radio Access (E-UTRA); Packet Data Convergence Protocol (PDCP) Specification," 3GPP TS 36.323 version 15.5.0 Release (2020).
Alcatel-Lucent, "Backward Compatibility of RRC Reconfiguration During Ho," 3GPP TSG-RAN WG2 Meeting #67 (2009).
Alcatel-Lucent, "LTE: 'Later Release Functionality' Handling at IntereNB Mobility," 3GPP TSG-RAN2#68bis Meeting (2010).
Google Inc., "Correction on Releasing Reference Time Preference Reporting and sl-Assistance ConfigNR," 3GPP TSG-RAN2 Meetin g#114-e (2021).
Office Action for European Application No. 21732681.8, dated Jun. 12, 2025.

\* cited by examiner

104 / 106A / 106B

200

104 / 106A / 106B     102     104 / 106A / 106B

300B

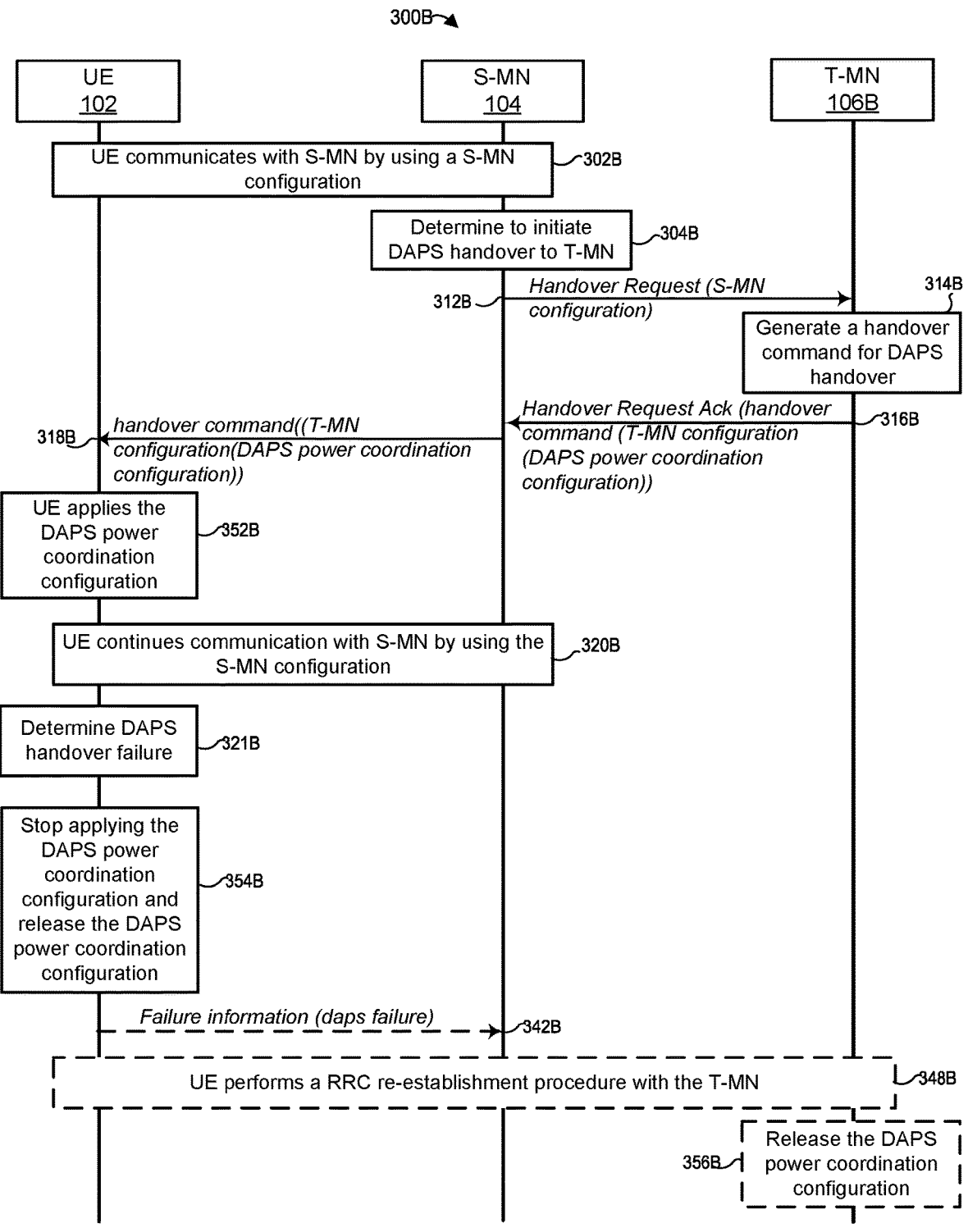

| UE 102 | S-MN 104 | T-MN 106B |
|---|---|---|

UE communicates with S-MN by using a S-MN configuration ⟋302B

Determine to initiate DAPS handover to T-MN ⟋304B

312B ⟍ *Handover Request (S-MN configuration)* → 314B

Generate a handover command for DAPS handover

*Handover Request Ack (handover command (T-MN configuration (DAPS power coordination configuration))* ⟋316B 318B ⟋ *handover command((T-MN configuration(DAPS power coordination configuration))*

UE applies the DAPS power coordination configuration ⟋352B

UE continues communication with S-MN by using the S-MN configuration ⟋320B

Determine DAPS handover failure ⟋321B

Stop applying the DAPS power coordination configuration and release the DAPS power coordination configuration ⟋354B

*Failure information (daps failure)* → ⟋342B

UE performs a RRC re-establishment procedure with the T-MN ⟋348B

356B ⟋ Release the DAPS power coordination configuration

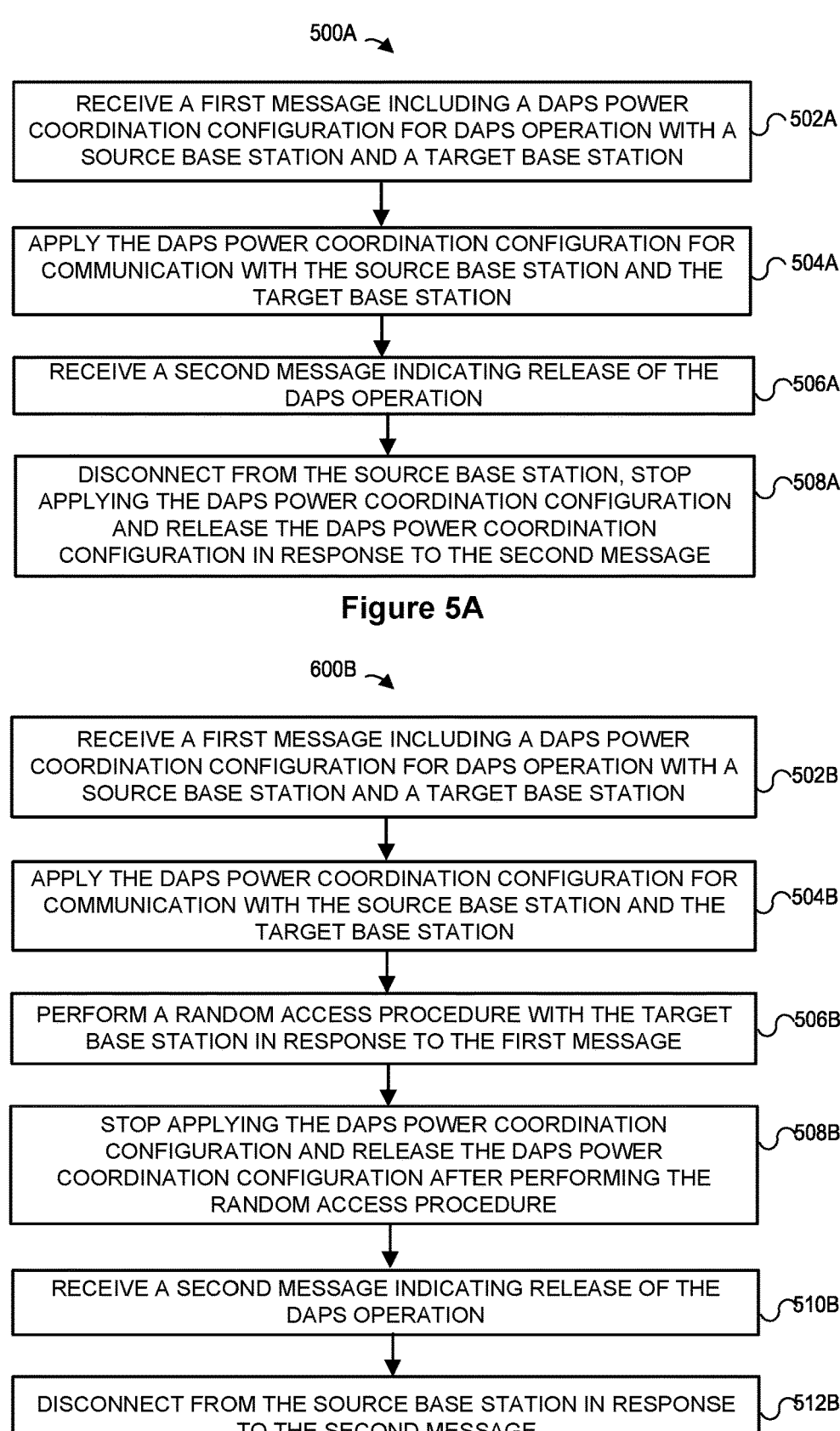

500A

RECEIVE A FIRST MESSAGE INCLUDING A DAPS POWER COORDINATION CONFIGURATION FOR DAPS OPERATION WITH A SOURCE BASE STATION AND A TARGET BASE STATION — 502A

APPLY THE DAPS POWER COORDINATION CONFIGURATION FOR COMMUNICATION WITH THE SOURCE BASE STATION AND THE TARGET BASE STATION — 504A

RECEIVE A SECOND MESSAGE INDICATING RELEASE OF THE DAPS OPERATION — 506A

DISCONNECT FROM THE SOURCE BASE STATION, STOP APPLYING THE DAPS POWER COORDINATION CONFIGURATION AND RELEASE THE DAPS POWER COORDINATION CONFIGURATION IN RESPONSE TO THE SECOND MESSAGE — 508A

RECEIVE A FIRST MESSAGE INCLUDING A DAPS POWER COORDINATION CONFIGURATION FOR DAPS OPERATION WITH A SOURCE BASE STATION AND A TARGET BASE STATION — 502B

APPLY THE DAPS POWER COORDINATION CONFIGURATION FOR COMMUNICATION WITH THE SOURCE BASE STATION AND THE TARGET BASE STATION — 504B

PERFORM A RANDOM ACCESS PROCEDURE WITH THE TARGET BASE STATION IN RESPONSE TO THE FIRST MESSAGE — 506B

STOP APPLYING THE DAPS POWER COORDINATION CONFIGURATION AND RELEASE THE DAPS POWER COORDINATION CONFIGURATION AFTER PERFORMING THE RANDOM ACCESS PROCEDURE — 508B

RECEIVE A SECOND MESSAGE INDICATING RELEASE OF THE DAPS OPERATION — 510B

DISCONNECT FROM THE SOURCE BASE STATION IN RESPONSE TO THE SECOND MESSAGE — 512B

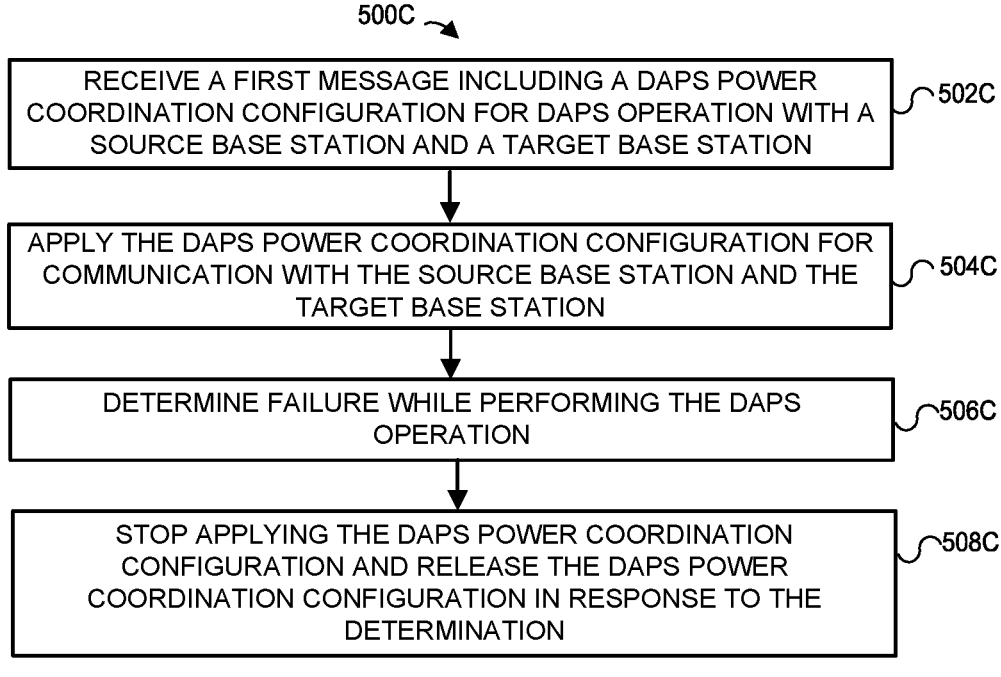

| RECEIVE A FIRST MESSAGE INCLUDING A DAPS POWER COORDINATION CONFIGURATION FOR DAPS OPERATION WITH A SOURCE BASE STATION AND A TARGET BASE STATION | 502C |

| APPLY THE DAPS POWER COORDINATION CONFIGURATION FOR COMMUNICATION WITH THE SOURCE BASE STATION AND THE TARGET BASE STATION | 504C |

| DETERMINE FAILURE WHILE PERFORMING THE DAPS OPERATION | 506C |

| STOP APPLYING THE DAPS POWER COORDINATION CONFIGURATION AND RELEASE THE DAPS POWER COORDINATION CONFIGURATION IN RESPONSE TO THE DETERMINATION | 508C |

| TRANSMIT TO A UE A FIRST MESSAGE INCLUDING A DAPS POWER COORDINATION CONFIGURATION FOR DAPS OPERATION WITH A SOURCE BASE STATION AND A TARGET BASE STATION | 602 |

| RELEASE THE DAPS POWER COORDINATION CONFIGURATION AFTER TRANSMITTING THE FIRST MESSAGE | 604 |

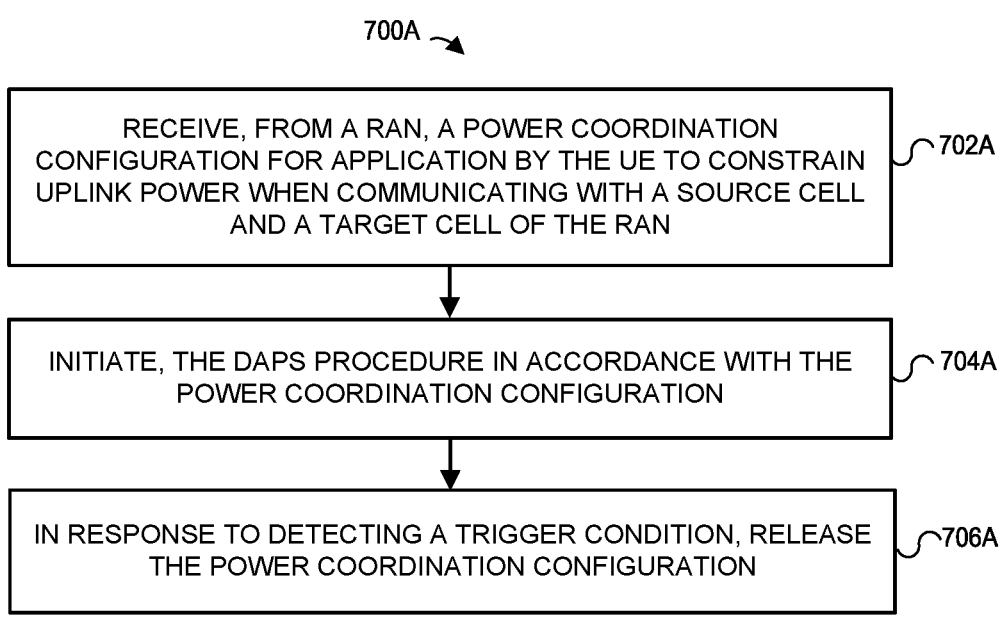

RECEIVE, FROM A RAN, A POWER COORDINATION CONFIGURATION FOR APPLICATION BY THE UE TO CONSTRAIN UPLINK POWER WHEN COMMUNICATING WITH A SOURCE CELL AND A TARGET CELL OF THE RAN    702A

INITIATE, THE DAPS PROCEDURE IN ACCORDANCE WITH THE POWER COORDINATION CONFIGURATION    704A

IN RESPONSE TO DETECTING A TRIGGER CONDITION, RELEASE THE POWER COORDINATION CONFIGURATION    706A

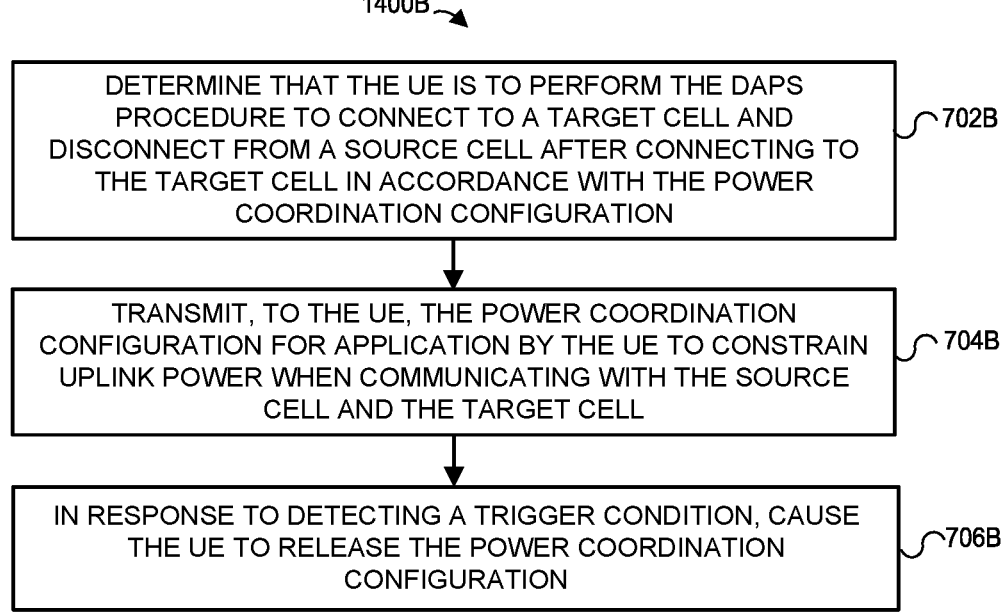

DETERMINE THAT THE UE IS TO PERFORM THE DAPS PROCEDURE TO CONNECT TO A TARGET CELL AND DISCONNECT FROM A SOURCE CELL AFTER CONNECTING TO THE TARGET CELL IN ACCORDANCE WITH THE POWER COORDINATION CONFIGURATION    702B

TRANSMIT, TO THE UE, THE POWER COORDINATION CONFIGURATION FOR APPLICATION BY THE UE TO CONSTRAIN UPLINK POWER WHEN COMMUNICATING WITH THE SOURCE CELL AND THE TARGET CELL    704B

IN RESPONSE TO DETECTING A TRIGGER CONDITION, CAUSE THE UE TO RELEASE THE POWER COORDINATION CONFIGURATION    706B

Figure 7B

MANAGING CONFIGURATIONS

CROSS-REFERENCE TO RELATED APPLICATIONS

This patent application is a national stage application, filed under 35 U.S.C. § 371, of International Application No. PCT/US2021/033137, filed May 19, 2021 and entitled "Managing Configurations," which claims priority to and the benefit of U.S. Provisional Patent Application No. 63/028,421, filed May 21, 2020 and entitled "Managing Configurations in Failure Scenarios," and which also claims priority to U.S. Provisional Patent Application No. 63/080, 835, filed Sep. 21, 2020 and entitled "Managing Configurations," the disclosures of which are incorporated by reference herein in their entireties.

FIELD OF THE DISCLOSURE

This disclosure relates generally to wireless communications and, more particularly, to managing configurations at a user device (UE) and radio access network (RAN).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected to other network elements by a backhaul.

Documents 3GPP TS 36.300 v16.0.0, 38.300 v16.0.0, and 38.401 v16.1.0 describe certain procedures related to handover or "reconfiguration with sync" scenarios. These procedures involve messaging (e.g., RRC signaling and preparation) between RAN nodes and a UE. UEs can perform handover procedures to switch from one cell to another, whether in single connectivity (SC) or DC or other type of multi-connectivity operation. The UE may hand over from a cell of a serving base station to a target cell of a target base station, or from a cell of a first distributed unit (DU) of a serving base station to a target cell of a second DU of the same base station, depending on the scenario.

Document 3GPP TS 37.340 v16.0.0 describes certain procedures for a UE to change PSCells in DC scenarios. These procedures involve messaging (e.g., RRC signaling and preparation) among RAN nodes and the UE. The UE may perform PSCell change from a PSCell of a serving SN to a target PSCell of a target SN, or from a PSCell of a source distributed unit (DU) of a base station to a PSCell of a target DU of the same base station, depending on the scenario.

More recently, 3GPP has been discussing and standardizing new technologies including for Release 16 (Rel-16) specifications such as 3GPP specifications 38.331 v16.0.0 and 36.331 v16.0.0. The new technologies include dual active protocol stack (DAPS) handover and DAPS PSCell change procedures for achieving Oms user data interruption during handover and PSCell change, respectively. Generally, the length of interruption experienced at the UE depends on a time difference between the time when a radio link connection at a source cell is released and the time when a radio link connection at a target cell is established. If the release time is no earlier than the established time, achieving Oms user data interruption is possible. Using a DAPS, the UE can simultaneously communicate with the source cell while establishing a radio link connection at the target cell, and subsequently stop communicating with the source cell after establishing a radio link connection at the target cell, when performing DAPS handover and DAPS PSCell change.

In some cases, the RAN can provide a DAPS power coordination configuration (e.g., daps-PowerCoordination-Info-r16) to the UE for the UE to perform a DAPS handover or DAPS PSCell change. The DAPS power coordination configuration generally indicates the maximum power that the UE can transmit on the source PCell and the maximum power that the UE can transmit on the target PCell. The DAPS power coordination configuration can also indicate the power control mode used by the UE during a DAPS handover. Upon receiving the DAPS power coordination configuration, the UE configures its lower layer (e.g., physical layer) to apply the DAPS power coordination configuration. However, in some of these scenarios, the UE and/or RAN may mishandle the DAPS power coordination configuration, causing the UE to unnecessarily restrict its maximum uplink power. As a result, in some scenarios, such as cell edge scenarios, the RAN may not receive transmissions from the UE, and the UE can encounter radio link failure, which causes service interruption.

In some cases, upon detecting a radio link failure while communicating with a source base station of the RAN using a configuration, the UE may suspend the configuration and initiate an RRC connection re-establishment procedure with a target base station of the RAN. However, in some scenarios, as the UE attempts to resume the configuration with the target base station, communication errors between the UE and the target base station may occur, such as when the target base station does not support the configuration otherwise supported by the source base station.

SUMMARY

Generally speaking, a UE and one or more base stations operating in a RAN implement the techniques of this disclosure to prepare the UE to perform a DAPS procedure (i.e., DAPS handover, DAPS PSCell change). Using these techniques, for example, the RAN can provide a DAPS power coordination configuration to the UE to restrict the maximum power that the UE can transmit on the source PCell and the target PCell while performing the DAPS procedure. To prevent the UE from unnecessarily communicating with the target PCell in accordance with the DAPS power coordination configuration after the UE successfully performs the DAPS procedure, the UE releases the DAPS power coordination configuration. The UE can release the DAPS power coordination configuration (a) in response to successfully performing the DAPS procedure; (b) in response to receiving a DAPS release indicator from the RAN after successfully performing the DAPS procedure, or (c) in response to failing to successfully perform the DAPS procedure.

An example embodiment of these techniques is a method in a UE for managing a power coordination configuration when performing a DAPS procedure. The method is implemented using processing hardware and includes receiving, from a RAN, a power coordination configuration for application by the UE to constrain uplink power when communicating with a source cell and a target cell of the RAN; initiating the DAPS procedure in accordance with the power coordination configuration; and in response to detecting a trigger condition, releasing the power coordination configuration.

Another example embodiment of these techniques is a method in a RAN for managing a power coordination configuration when performing a DAPS procedure with a UE. The method is implemented using processing hardware and includes determining that the UE is to perform the DAPS procedure to connect to a target cell and disconnect from a source cell after connecting to the target cell in accordance with the power coordination configuration; transmitting, to the UE, the power coordination configuration for application by the UE to constrain uplink power when communicating with the source cell and the target cell; and in response to detecting a trigger condition, causing the UE to release the power coordination configuration.

Still another embodiment of these techniques is a base station including processing hardware and configured to implement one of methods above.

Another embodiment of these techniques is a UE including processing hardware and configured to implement one of methods above.

BRIEF DESCRIPTION OF THE DRAWINGS

FIGS. 3A and 3B are messaging diagrams of example scenarios in which a RAN prepares a DAPS handover procedure for a UE by providing a DAPS power coordination configuration to the UE;

FIG. 5A is a flow diagram of an example scenario in which a UE stops applying and releases a DAPS power coordination configuration in response to receiving a message from a RAN;

FIG. 5B is a flow diagram of another example scenario in which a UE stops and releases a DAPS power coordination configuration after performing a random access procedure with the RAN;

FIG. 5C is a flow diagram of another example scenario in which a UE stops and releases a DAPS power coordination configuration after determining DAPS operation failure with a RAN;

FIG. 6 is a flow diagram of an example scenario in which a RAN provides a DAPS power coordination configuration to the UE and later releases the DAPS power coordination configuration;

FIG. 7A is a flow diagram of an example method in which a UE manages a power coordination configuration when performing a DAPS procedure with a RAN; and FIG. 7B is a flow diagram of an example method in which a RAN manages a power coordination configuration when performing a DAPS procedure with a UE.

DETAILED DESCRIPTION OF THE DRAWINGS

Figure 1A:
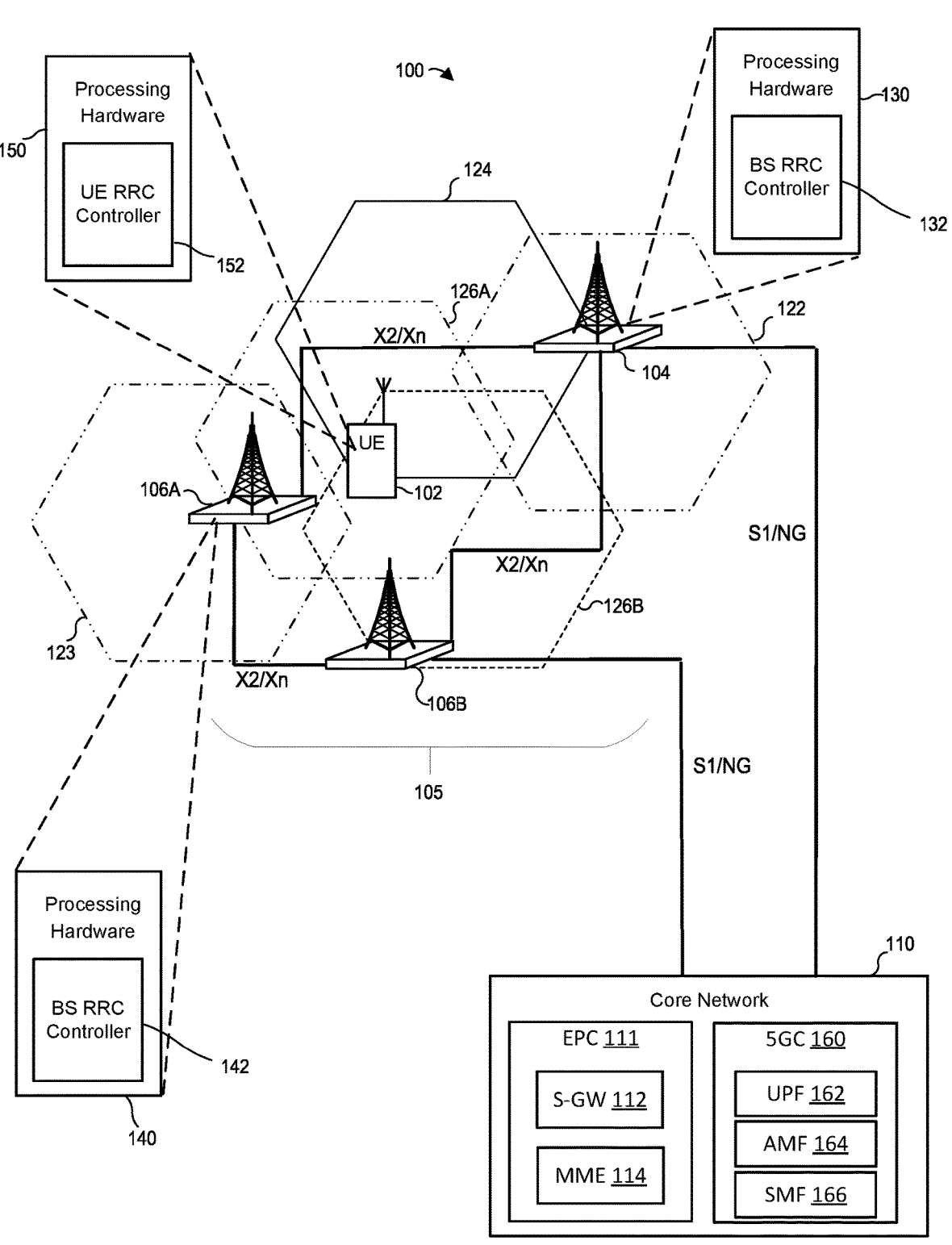
FIG. 1A is a block diagram of an example system in which a RAN and a UE can implement the techniques of this disclosure for managing configurations, when performing DAPS handover, DAPS PSCell change, or RRC re-establishment procedures.

FIG. 1A depicts an example wireless communication system 100 that can implement configuration handling techniques of this disclosure, such as when performing DAPS handover, DAPS PSCell change, or RRC re-establishment procedures. The wireless communication system 100 includes a UE 102, as well as RAN 105 (e.g., base stations 104, 106A, 106B) that are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs.

The base station 104 supports a cell 124, the base station 106A supports a cell 126A, and the base station 106B supports a cell 126B. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A or 106B, etc.). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB, or an MgNB, and the base station 106A operates as a candidate SgNB (C-SgNB) or a candidate Sng-eNB (C-Sng-eNB). Although various scenarios are described below in which the base station 104 operates as an MN and the base station 106A (or 106B) operates as an SN or T-SN, any of the base stations 104, 106A, 106B generally can operate as an MN, an SN or a T-SN in different scenarios. Thus, in some implementations, the base station 104, the base station 106A, and the base station 106B can implement similar sets of functions and each support MN, SN, and T-SN operations.

In operation, the UE 102 can use a radio bearer (e.g., a DRB or an SRB) that at different times terminates at an MN (e.g., the base station 104) or an SN (e.g., the base station 106A). For example, after handover to the base station 106B, the UE 102 can use a radio bearer (e.g., a DRB or an SRB) that at different times terminates at the base station 106B. The UE 102 can apply one or more security keys when communicating on the radio bearer, in the uplink (from the UE 102 to a base station) and/or downlink (from a base station to the UE 102) direction.

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation in FIG. 1A includes a base station RRC controller 132 that is configured to manage or control RRC configurations and RRC procedures. For example, the base station RRC controller 132 can be configured to support RRC messaging associated with DAPS handover and DAPS PSCell change procedures, re-establishment procedures, resume procedures, and/or to support the necessary operations when the base station 104 operates as an MN, as discussed below.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station RRC controller 142 that is configured to manage or control RRC configurations and RRC procedures. For example, the base station RRC controller 142 can be configured to support RRC messaging associated with DAPS handover and DAPS PSCell change procedures, re-establishment procedures, resume procedures, and/or to support the necessary operations when the base station 106A operates as an SN or target SN (T-SN), as discussed below. While not shown in FIG. 1A, the base station 106B can include processing hardware similar to the processing hardware 140 of the base station 106A.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE RRC controller 152 that is configured to manage or control RRC configurations RRC procedures. For example, the UE RRC controller 152 can be configured to support RRC messaging associated with DAPS handover and DAPS PSCell change procedures and/or re-establishment procedures, in accordance with any of the implementations discussed below.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or a gNB that supports the NR radio interface as well as an NG interface for communicating with the 5GC 160. The base stations 106A, 106B can each be an EN-DC gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. For example, base station 104 and base station 106A can also support cells 122 and 123, respectively. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

As indicated above, the wireless communication system 100 can support various procedures (e.g., DAPS handover, DAPS PSCell change, re-establishment, etc.) and modes of operation (e.g., SC or DC). Example operation of various procedures that can be implemented in the wireless communication system 100 will now be described.

In some implementations, the wireless communication system 100 supports a legacy handover preparation procedure (i.e., a non-DAPS handover preparation procedure). In one scenario, for example, the base station 104 can perform a non-DAPS handover preparation procedure to configure the UE 102 to handover from a cell 124 of the base station 104 to a cell 126A of the base station 106A. In this scenario, the base station 104 and the base station 106A operate as a source base station (S-BS) or a source MN (S-MN), and a target base station (T-BS) or a target MN (T-MN), respectively. In the non-DAPS handover preparation procedure, the base station 104 sends a Handover Request message to the base station 106A. In response to the Handover Request message, the base station 106A includes configuration parameters configuring radio resources for the UE 102 in a handover command message, includes the handover command message in a Handover Request Acknowledge message, and sends the Handover Request Acknowledge message to the base station 104. In turn, the base station 104 transmits the handover command message to the UE 102 and subsequently discontinues (or stops) transmitting data to or receiving data from the UE 102.

Upon receiving the handover command message, the UE 102 hands over to the base station 106A via cell 126A and communicates with the base station 106A by using the configuration parameters in the handover command message. Particularly, in response to the handover command message, the UE 102 disconnects from the cell 124 (or the base station 104), performs a random access procedure with the base station 106A via the cell 126A, and transmits a handover complete message to the base station 106A via the cell 126A.

In some implementations, the wireless communication system 100 supports a DAPS handover preparation procedure. In one scenario for example, the base station 104 can perform a DAPS handover preparation procedure to configure the UE 102 to hand over from a cell 124 of the base station 104 to a cell 126B of the base station 106B. In this scenario, the base station 104 and the base station 106B operate as an S-BS or an S-MN, and a T-BS or a T-MN, respectively. In the DAPS handover preparation procedure, the base station 104 sends a Handover Request message to the base station 106B. In some implementations, the base station 104 can explicitly request DAPS handover in the Handover Request message, e.g., by including a DAPS indicator in the Handover Request message. In response to the Handover Request message, and to accept the request for DAPS handover, the base station 106B includes configuration parameters configuring radio resources for the UE 102 in a handover command, includes the handover command message in a Handover Request Acknowledge message, and sends the Handover Request Acknowledge message to the base station 104. In some implementations, the base station 106B can indicate DAPS handover in the handover command message, e.g., by including DAPS configuration(s) or a DAPS indicator in the handover command message, or can include an indicator in the Handover Request Acknowledge message. In turn, the base station 104 transmits the handover command message to the UE 102.

Upon receiving the handover command message, the UE 102 performs the DAPS handover procedure to hand over to the base station 106B via cell 126B and communicates with the base station 106B by using the configuration parameters in the handover command message. Particularly, in response to the handover command message, whereas in the non-DAPS handover procedure the UE 102 disconnects from the cell 124 (or the base station 104), the UE 102 in the DAPS handover procedure maintains the connection to the base station 104 via cell 124, performs a random access procedure with the base station 106B via cell 126B, and transmits a handover complete message to the base station 106B via cell 126B.

In maintaining the connection to the base station 104 via cell 124 in the DAPS handover procedure, the UE 102 effectively has two links, i.e., a source MCG link with the base station 104 and a target MCG link with the base station 106B. The UE 102 can continue receiving data (i.e., downlink data) from the base station 104 until the UE 102 receives an indication from the base station 106B to release the source MCG link with the base station 104. The UE 102 can continue transmitting data (e.g., new uplink data transmission or retransmission of PDCP SDUs) to the base station 104 until the UE 102 either successfully completes the random access procedure with the base station 106B or receives the indication from the base station 106B to release the MCG link with the base station 104.

In some implementations, in the handover preparation procedure scenarios above, the wireless communication system 100 supports DC operation. In one scenario, for example, after the UE 102 connects to the base station 104, and the base station 104 performs an SN addition procedure to add the base station 106A as an SN, thereby configuring the UE 102 to operate in DC with the base stations 104 and 106A. At this point, the base stations 104 and 106A operate as an MN and an SN, respectively. Later on, the MN 104 can initiate the non-DAPS or DAPS handover preparation procedures to hand over the UE 102 to the T-MN 106B.

In some implementations, the wireless communication system 100 supports a legacy PSCell change preparation procedure (i.e., a non-DAPS PSCell change preparation procedure). In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 stops communicating with the SN 106A via PSCell 123 and attempts to connect to the T-PSCell 126A after receiving the configuration for the T-PSCell 126A. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the non-DAPS PSCell change procedure. The UE 102 stops communicating with the S-SN 106A via PSCell 123 and attempts to connect to the T-SN 106B via T-PSCell 126B after receiving the configuration for the T-PSCell 126B.

In some implementations, the wireless communication system 100 supports DAPS PSCell change. In one scenario, for example, the UE 102 is initially in DC with the MN 104 (e.g., via PCell 124) and the SN 106A (via a PSCell 123). The SN 106A can provide a configuration for the T-PSCell 126A, for the UE 102. The UE 102 continues communicating with the SN 106A via PSCell 123 while attempting to connect to the T-PSCell 126A after receiving the configuration for the T-PSCell 126A. After the T-PSCell 126A begins to operate as the PSCell 126A for the UE 102, the UE 102 stops communicating with the SN 106A via PSCell 123. In another scenario, for example, while the UE 102 is in DC with the MN 104 and the SN 106A, the MN 104 determines to change the SN of the UE 102 from the base station 106A (which may be referred to as the source SN or S-SN) to the base station 106B (which may be referred to as the target SN or T-SN) as part of the DAPS PSCell change procedure. The UE 102 continues communicating with the S-SN 106A via PSCell 123 while attempting to connect to the T-SN 106B via T-PSCell 126B after receiving the configuration for the T-PSCell 126B. After the T-PSCell 126B begins to operate as the PSCell 126B for the UE 102, the UE 102 stops communicating with the S-SN 106A via PSCell 123.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EUTRA-NR DC (EN-DC) with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is an Sng-eNB, the UE 102 can be in NR-EUTRA DC (NE-DC) with the MgNB 104 and the Sng-eNB 106A.

Figure 1B:
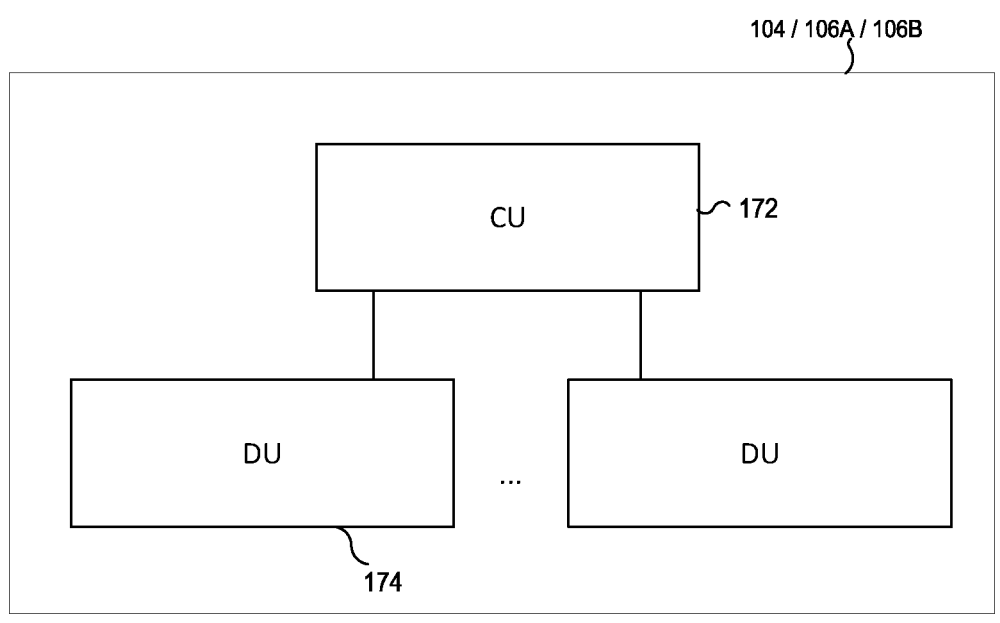
FIG. 1B is a block diagram of an example base station in which a centralized unit (CU) and a distributed unit (DU) can operate in the system of FIG. 1A.

FIG. 1B depicts an example, distributed implementation of any one or more of the base stations 104, 106A, 106B. In this implementation, the base station 104, 106A, or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A. The processing hardware can include a base station RRC controller (e.g., RRC controller 142) configured to manage or control one or more RRC configurations and/or RRC procedures when the base station (e.g., base station 106A) operates as an SN.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures.

Figure 2:
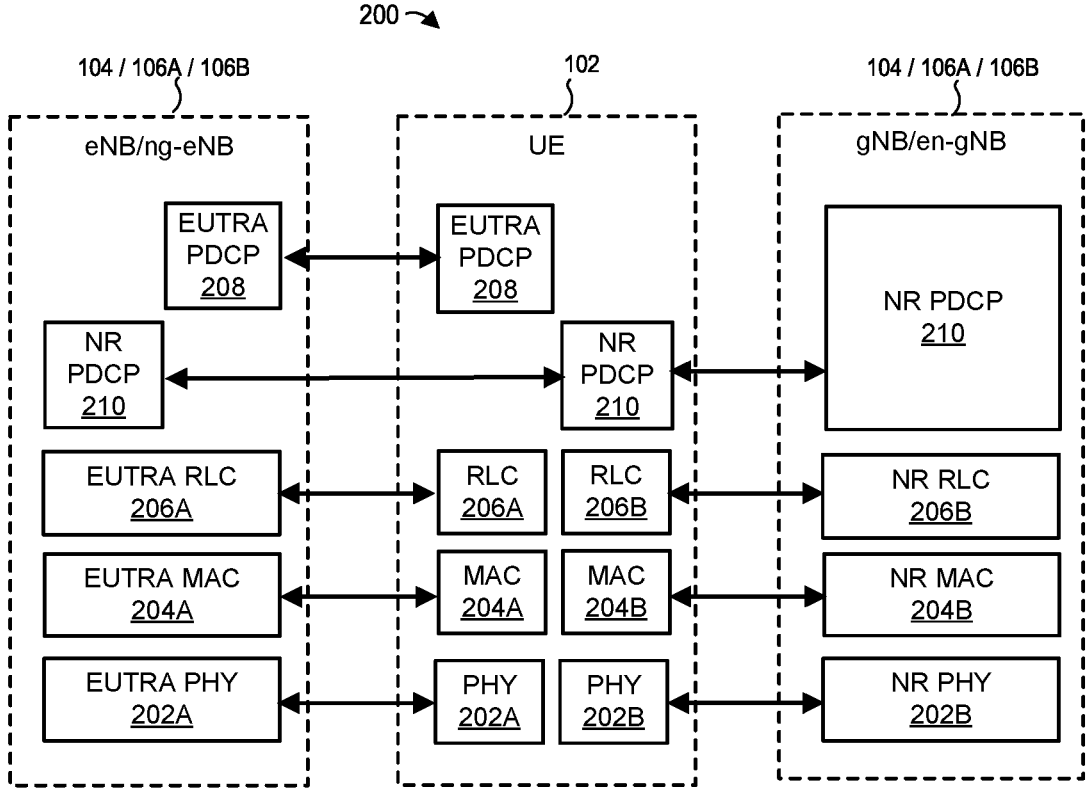
FIG. 2 is a block diagram of an example protocol stack, according to which the UE of FIG. 1A can communicate with base stations of FIG. 1A.

FIG. 2 illustrates, in a simplified manner, an example dual active protocol stack (DAPS) 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

Figure 3A:
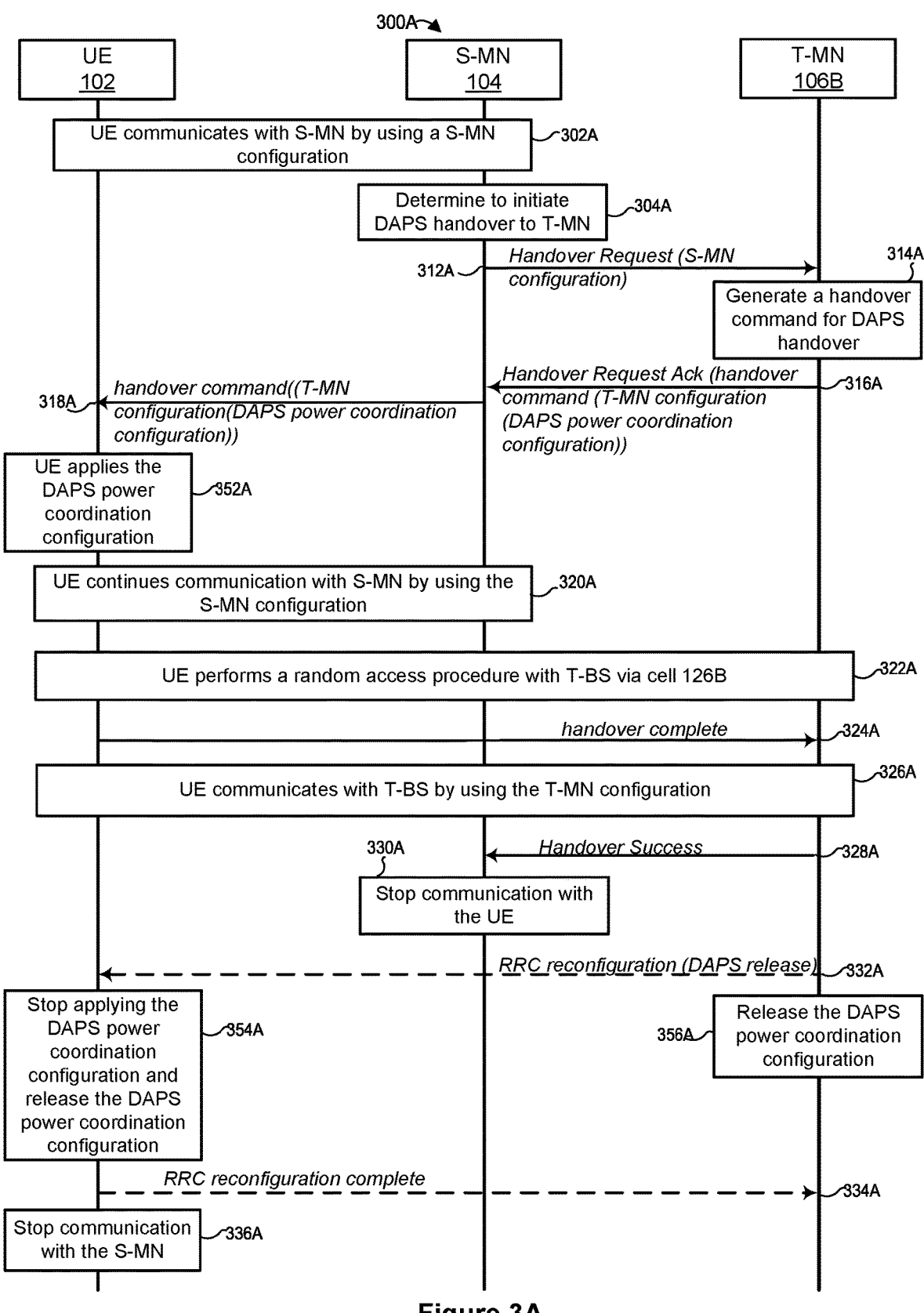
Figure 4A:
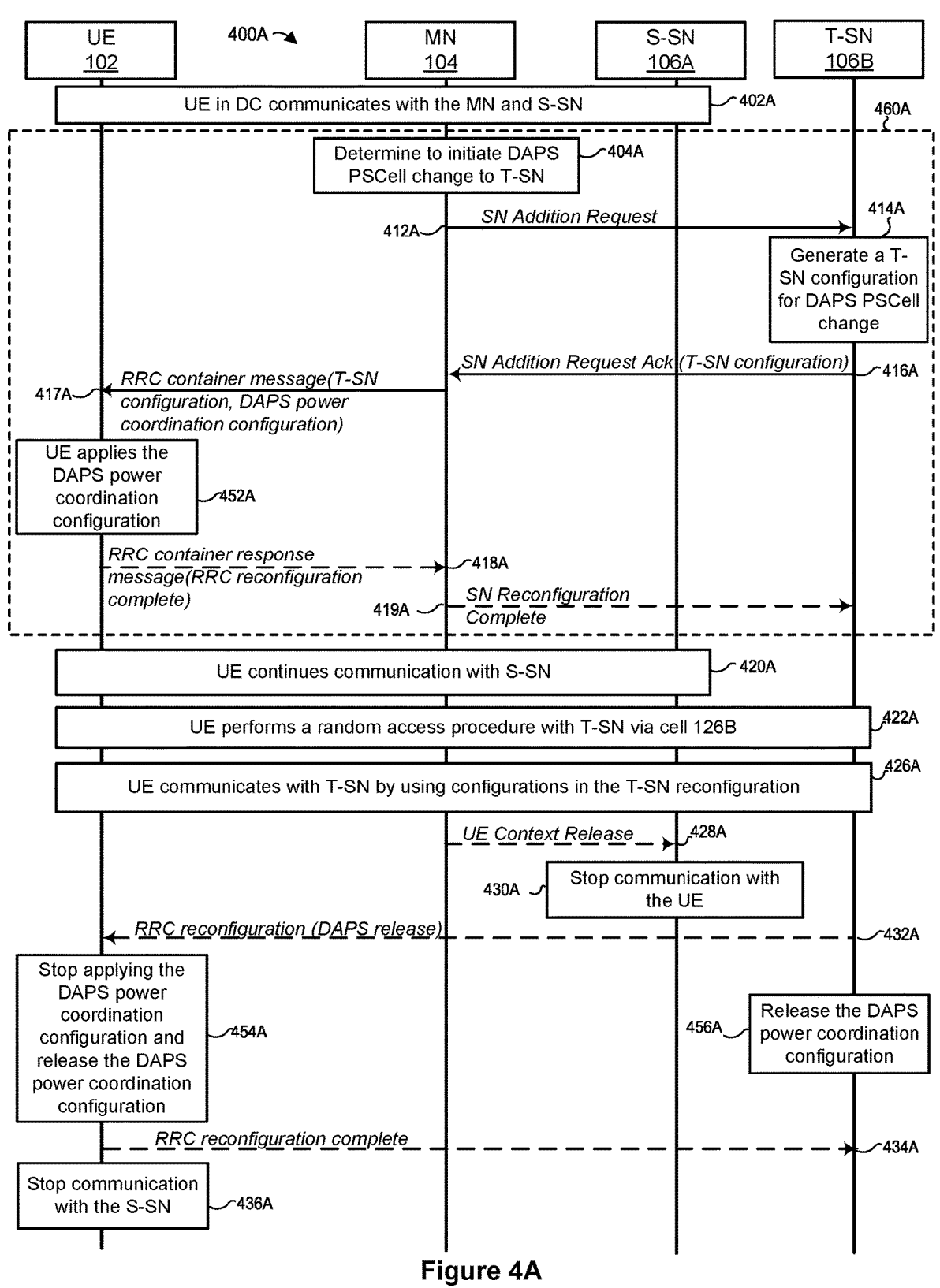
FIGS. 4A and 4B are messaging diagrams of example scenarios in which a RAN prepares a DAPS PSCell change procedure for a UE by providing a DAPS power coordination configuration to the UE.
Figure 4B:
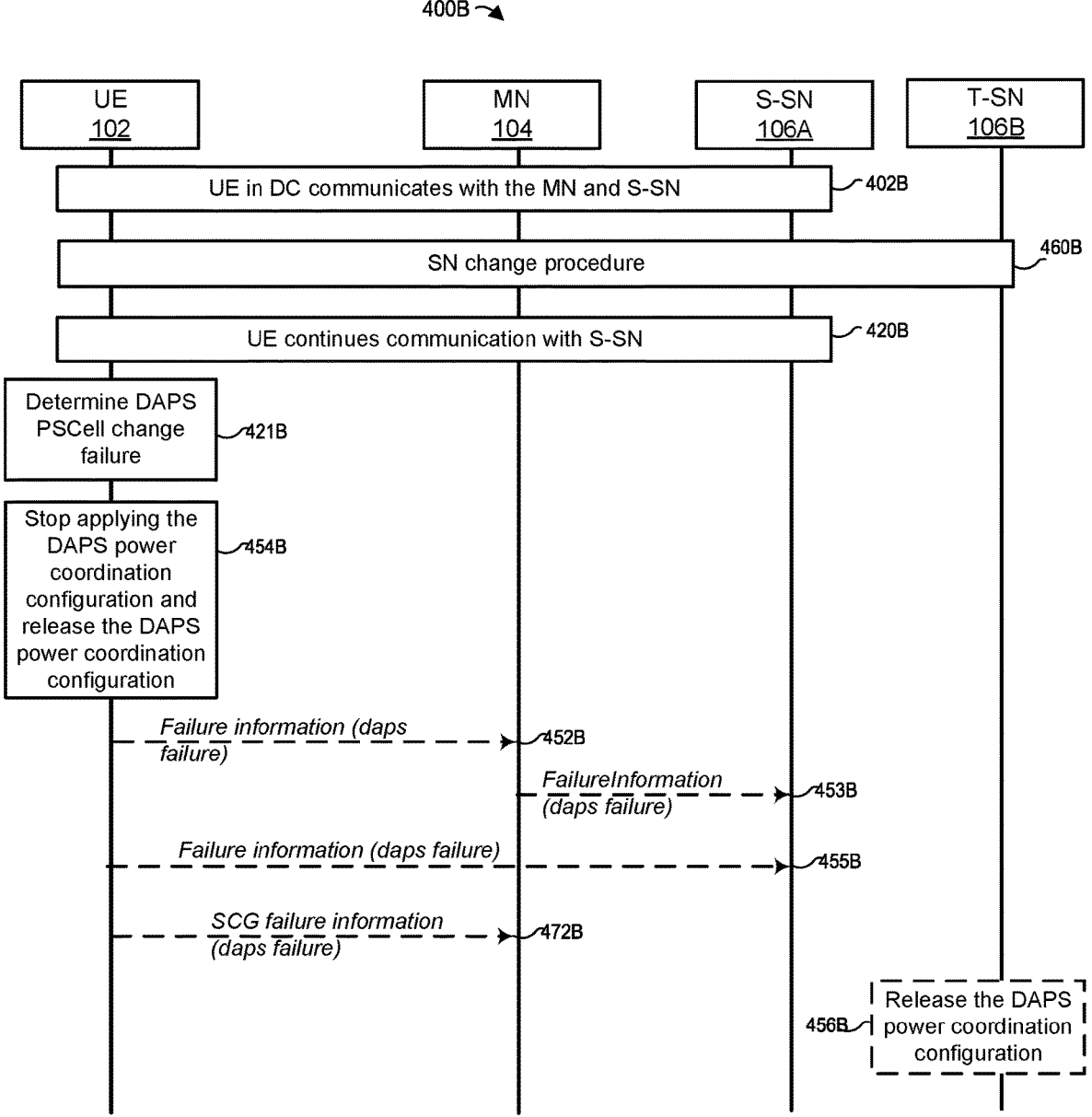

FIGS. 3A and 3B correspond to DAPS handover scenarios in which a base station initiates a DAPS handover procedure for a UE. FIGS. 4A and 4B correspond to DAPS PSCell change scenarios in which a base station initiates a DAPS PSCell change procedure for a UE. While FIGS. 3A, 3B, 4A, and 4B and the accompanying descriptions refer specifically to the UE 102 and base stations 104, 106A, and/or 106B of FIG. 1, it is understood that the following techniques may be implemented by other components and/or in systems other than the wireless communication system 100 of FIG. 1.

Referring first to FIG. 3A, according to a DAPS handover scenario 300A, the base station 104 operates as a source MN (S-MN) for the UE 102, and the base station 106B operates as a target MN (T-MN) for the UE 102. The base station 104 and base station 106B can be referred to as the MNs both in SC and DC scenarios.

Initially, the UE 102 communicates 302A data (e.g., uplink (UL) data PDUs and/or downlink (DL) data PDUs) with the S-MN 104 by using an S-MN configuration. In some scenarios, the UE 102 communicates 302A data in SC with the S-MN 104, or communicates 302A data in DC with the S-MN 104 (operating as an MN) and an SN (e.g., the base station 106A) not shown in FIG. 3A.

Later in time, the S-MN 104 determines 304A to initiate DAPS handover for the T-MN 106B and the UE 102 to communicate, e.g., blindly or in response to detecting a suitable event. For example, the determination in event 304A can occur in response to the S-MN 104 receiving one or more measurement report results from the UE 102 that are above (or below) one or more predetermined thresholds, or calculating a filtered result (from the measurement result(s)) that is above (or below) a predetermined threshold. In another example, the suitable event can be that the UE 102 is moving toward the T-MN 106B. In yet another example, the suitable event can be one or more measurement results, generated or obtained by the S-MN 104 based on measurements of signals received from the UE 102, being above (or below) one or more predetermined thresholds.

After determining 304A to initiate DAPS handover, the S-MN 104 sends 312A a Handover Request message to the T-MN 106B. In some implementations, the Handover Request message includes the S-MN configuration. In response, the T-MN 106B generates 314A a handover command message for DAPS handover that includes a T-MN configuration including a DAPS power coordination configuration (e.g., a DAPS-PowerCoordinationInfo-r16 IE or DAPS-Configuration-r16 IE), includes the handover command message in a Handover Request Acknowledge message, and sends 316A the Handover Request Acknowledge message to the S-MN 104. In turn, the S-MN 104 transmits 318A the handover command message to the UE 102. The handover command message also includes one or more random access configurations needed by the UE 102 to handover to the T-MN 106B, and in some implementations, includes additional fields or IEs, such as a mobility field or IE for a PCell of the T-MN 106B (e.g., mobilityControlInfo field, a reconfigurationWithSync field, MobilityControlInfo IE, a ReconfigurationWithSync IE), which can include some or all of the random access configurations. In some implementations the T-MN 106B can include the DAPS power coordination configuration in the mobility field or IE.

In some implementations, the T-MN 106B can include, in the handover command message, DAPS configuration(s)

(e.g., daps-Config field(s) or a daps-HO field(s)) indicating particular DRB(s) as DAPS bearer(s). The DAPS configuration(s) enables the UE 102 to use a DAPS (e.g., DAPS 200) for the DAPS bearer(s) to communicate with the S-MN 104 (using configurations in the S-MN configuration) and T-MN 106B (using configurations in the T-MN configuration during and after a successful DAPS handover).

As such, in response to receiving 318A the handover command message, the UE 102 (e.g., PHY 202) applies (i.e., uses) 352A the DAPS power coordination configuration, and continues 320A communicating with the S-MN 104 using the S-MN configuration while the UE 102 attempts to handover to the T-MN 106B in accordance with the handover command message. In some implementations, the RRC controller 152 can send DAPS power coordination configuration parameters in the DAPS power coordination configuration to the PHY 202, which in turn applies the DAPS power coordination configuration parameters.

In attempting to perform the DAPS handover, the UE 102 initiates 322A a random access procedure with the T-MN 106B via a target cell (e.g., PCell 126B) covered by the T-MN 106B, e.g., by using one or more random access configurations in the handover command message received from the S-MN 104 at event 318A. After gaining access to a channel, the UE 102 transmits 324A a handover complete message to the T-MN 106B via the target cell during or after successfully completing the random access procedure. After the T-MN 106B identifies the UE 102 during the random access procedure (i.e., the UE 102 succeeds in the random access contention resolution) or receives 324A the handover complete message, the UE 102 communicates 326A control signals and data (e.g., UL data PDUs or DL data PDUs) with the T-MN 106B via the target cell by using configurations indicated in the handover command message. The T-MN 106B sends 328A a Handover Success message to the S-MN 104. After receiving the Handover Success message, the S-MN 104 stops 330A communicating with the UE 102.

The DAPS configuration(s) and/or the DAPS power coordination configuration enable the UE 102 to continue communicating with the S-MN 104 while simultaneously communicating with the T-MN 106B. Because the UE 102 no longer needs to use the DAPS to continue communicating with the S-MN 104 after successfully performing the DAPS handover, the UE 102 can stop 354A applying the DAPS power coordination configuration and release the DAPS power coordination configuration. In this way, the UE 102 will not unnecessarily restrict its maximum uplink power according to the DAPS power coordination configuration when communicating with the T-MN 106B, thereby decreasing the chances of radio link failure with the T-MN 106B. In some implementations, the T-MN 106B can send 332A an RRC reconfiguration message that includes a DAPS release indicator to the UE 102, e.g., via the target cell (e.g., PCell 126B), before, after, or simultaneously while transmitting 328A the Handover Success message. In response to the RRC' reconfiguration message or the DAPS release indicator, the UE 102 can stop 354A applying the DAPS power coordination configuration and release the DAPS power coordination configuration. In some implementations, the UE 102 can stop 354A applying the DAPS power coordination configuration and release the DAPS power coordination configuration after successfully performing 322A the random access procedure. In some implementations, the RRC controller 152 can send an indication to the PHY 202 of the UE 102, causing the PHY 202 to stop applying 354A the DAPS power coordination configuration.

In some implementations, the T-MN 106B can also release 356A the DAPS power coordination configuration, because the UE 102 no longer needs to use the DAPS power coordination configuration and/or the UE 102 released 354A the DAPS power coordination configuration. That is, the T-MN 106B can release the DAPS power coordination configuration after including the DAPS power coordination configuration in the handover command message in event 316A.

Subsequent to event 354A, the UE 102 can transmit 334A an RRC reconfiguration complete message to the T-MN 106B and stop 336A communicating (i.e., UL and/or DL communication) with the S-MN 104. In some implementations, in response to the DAPS release indicator, a RF chip, receiver, or a transceiver of the UE 102 used to communicate with the S-MN 104 during the DAPS handover can enter into low power consumption mode, sleep mode, or be turned off entirely if the DAPS handover is an inter-frequency DAPS handover.

In some implementations, the DAPS power coordination configuration includes one or more of the following DAPS power coordination configuration parameters: the maximum total transmission power (or value thereof) that the UE 102 can use for uplink communication with the S-MN 104 during DAPS handover (interchangeably referred to as "CP1"), the maximum total transmission power (or value thereof) that the UE 102 can use for uplink communication with the T-MN 106B during DAPS handover (interchangeably referred to as "CP2"), and/or an uplink power sharing mode that the UE 102 uses during DAPS handover (interchangeably referred to as "CP3"). The DAPS power coordination configuration parameters can be included in fields or IEs of the DAPS power coordination configuration, in some implementations. For ease of readability throughout this disclosure, a "configuration" (e.g., DAPS power coordination configuration) refers to one or more parameters included in the configuration. Further, "parameter" or "parameters" as described herein also refers to value(s) corresponding to the parameter(s).

After the UE 102 (e.g., PHY 202) applies the DAPS power coordination configuration during the DAPS handover, the UE 102 (e.g., PHY 202) can determine (or manage or coordinate) its uplink transmission power for transmissions to the S-MN 104 and its uplink transmission power for transmissions to the T-MN 106B according to the DAPS power coordination configuration, e.g., pursuant to 3GPP specification 38.213 v16.1.0 or 36.213 v16.1.0. In some implementations, if the uplink power sharing mode as designated in CP3 is a first mode (e.g., semi-static mode 1), the UE 102 manages its uplink transmission power to not exceed CP1 while transmitting 320A to the S-MN 104, and to not exceed CP2 while transmitting 326A to the T-MN 106B. In other implementations, if the uplink power sharing mode is a second mode (e.g., semi-static mode 2 or dynamic mode), and a first uplink transmission to the S-MN 104 partially or completely overlaps with a second uplink transmission to the T-MN 106B, the UE 102 manages uplink transmission power of the first uplink transmission and the second uplink transmission to not exceed CP1 and CP2, respectively. If the uplink power sharing mode is the second mode and the first uplink transmission to the S-MN 104 does not overlap with the second uplink transmission to the T-MN 106B, the UE 102 manages uplink transmission power of the first uplink transmission and the second uplink transmission to not exceed respective maximum total transmission power values other than those included in the DAPS power coordination configuration.

In some implementations, the S-MN 104 and T-MN 106B can provide these respective maximum total transmission power values to the UE 102 in respective non-DAPS configuration(s). The S-MN 104 can send non-DAPS configuration(s) to the UE 102 in broadcast message(s) (e.g., system information block(s) and/or a dedicated message (e.g., RRC reconfiguration message)), and the T-MN 106B can send non-DAPS configuration(s) to the UE 102 in the handover command message, or broadcast message(s) (e.g., system information block(s)) on PCell 126B), in some implementations.

In some implementations, the T-MN 106B receives a configuration restriction for the DAPS handover from the S-MN 104 in the Handover Request message. The T-MN 106B can generate the DAPS power coordination configuration according to the configuration restriction. In one implementation, the S-MN 104 can generate and include preferred power coordination configuration parameters in the configuration restriction, and in turn the T-MN 106B can include such preferred parameters in the DAPS power coordination configuration. In one implementation, the S-MN 104 can determine the preferred parameters based on the UE capability of the UE 102. For example, the UE capability can indicate or include a UE power class and/or DAPS power sharing mode(s) supported by the UE 102. If the UE capability includes or otherwise indicates supported uplink power sharing mode(s), the S-MN 104 can set the preferred uplink sharing mode to one of the supported uplink power sharing mode(s). If the UE 102 is configured to implement all uplink sharing modes supported by the RAN 105, the S-MN 104 can select a particular preferred uplink sharing mode according to one or more of the following preferred power coordination configuration parameters: UE power class (interchangeably referred to as "PCP1") and/or regulation requirements (interchangeably referred to as "PCP2").

Similarly, in another implementation, the T-MN 106B can determine some or all of the DAPS power coordination configuration parameters in the DAPS power coordination configuration based on the preferred power coordination configuration parameters provided by the S-MN 104, and/or the UE capability of the UE 102. If the UE capability includes or otherwise indicates supported uplink power sharing mode(s), the T-MN 106B can set the uplink sharing mode to one of the supported uplink power sharing mode(s) or the preferred uplink sharing mode provided by the S-MN 104. If the UE 102 is configured to implement all uplink sharing modes supported by the RAN 105, the T-MN 106B can select a particular uplink sharing mode according to PCP1, PCP2, and/or the same preferred power coordination configuration parameters provided by the S-MN 104.

In some implementations, after successfully completing 322A the random access procedure, the UE 102 stops transmitting and retransmitting UL data PDUs and/or control signals on physical uplink control channel(s) (PUCCH(s)) to the S-MN 104. In other implementations, the UE 102 stops transmitting new UL data PDUs to the S-MN 104 but continues to retransmit UL data PDU(s) to the S-MN 104 if requested by the S-MN 104 after successfully completing 322A the random access procedure, until event 336A occurs. In such implementations, the UE 102 can continue DL communicating (i.e., receiving control signals, reference signals, DL PDUs, etc.) with the S-MN 104 and/or transmit control signals (e.g., HARQ acknowledgement, HARQ negative acknowledgement and/or channel state information) on PUCCH(s) to the S-MN 104 until event 332A occurs or a DAPS release timer at the UE 102 expires. The T-MN 106B can configure the timer value for the DAPS release timer in the handover command message in event 314A or the RRC reconfiguration message in event 332A, in some implementations. Upon receiving 318A the handover command message or receiving 332A the RRC reconfiguration message, the UE 102 starts the DAPS release timer. When the DAPS release timer expires, the UE 102 stops 336A communicating with the S-MN 104. In other implementations, the UE 102 uses a predetermined timer value if the T-MN 106B does not include the timer value in the handover command message or the RRC reconfiguration message. The T-MN 106B can include the predetermined timer value in the Handover Success message, which can be the same timer value as that in the RRC' reconfiguration message, or a larger value than that in the handover command message.

In some implementations, the T-MN configuration includes multiple configuration parameters (e.g., corresponding to physical layer, MAC layer, and/or RLC layer configurations) to configure radio resources. The UE 102 can use these multiple configuration parameters to communicate with the T-MN 106B via target PCell 126B. The multiple configuration parameters can configure zero, one, or more radio bearers, including SRB(s) (e.g., SRB1, SRB2 and/or SRB4) and/or DRB(s). For instance, the UE 102 can exchange RRC messages with the T-MN 106B via the SRB(s) (i.e., SRB(s) for the target PCell), and communicate data with the T-MN 106B via the DRB(s).

In some implementations, the MN configuration (i.e., the S-MN configuration or T-MN configuration) can include a CellGroupConfig IE. The MN configuration can be an RRC Reconfiguration message, RRC Reconfiguration-IEs, or the CellGroupConfig IE conforming to 3GPP TS 38.331, or an RRC ConnectionReconfiguration message or RRC ConnectionReconfiguration-IEs conforming to 3GPP TS 36.331. In some implementations, the MN configuration can include configurations in the CellGroupConfig IE, RRCReconfiguration-IEs, or RRCConnectionReconfiguration-IEs.

In some implementations, the S-MN 104 consists of CU 172 and one or more DUs 174 as shown in FIG. 1B. The DU(s) 174 can generate the S-MN configuration or at least a portion of the S-MN configuration, and send the S-MN configuration (or portion) to the CU 172. The CU 172 can generate the remainder of the S-MN configuration if the DU 174 only generated a portion of the S-MN configuration. The DU(s) 174 can communicate with the UE 102 via the portion of the S-MN configuration, and the CU 172 can communicate with the UE 102 via the remainder of the S-MN configuration, in one implementation. For example, the S-MN configuration (or portion) generated by the DU 174 can include one or more random access configurations, a physical downlink control channel (PDCCH) configuration, a PUCCH configuration, etc. The remainder of the S-MN configuration generated by the CU 172 can include an SRB configuration, a DRB configuration, a security configuration, and/or a measurement configuration. In other implementations, the DU 174 can include a cell group configuration (e.g., CellGroupConfig IE) in the S-MN configuration, and the CU 172 can include a radio bearer configuration (RadioBearerConfig IE) in the S-MN configuration.

Similarly, in some implementations, the T-MN 106B consists of CU 172 and one or more DUs 174 as shown in FIG. 1B. The UE 102 can perform 322A the random access procedure with at least one of the DU(s) 174. The DU 174 generates some configurations (e.g., one or more random access configurations, a PDCCH configuration, a PUCCH configuration) and sends the configurations to the CU 172. The CU 172 can include other configurations (e.g., an SRB configuration, a DRB configuration, a security configuration, and/or a measurement configuration) in the handover command message. In other implementations, the DU 174 can generate a cell group configuration (e.g., CellGroupConfig IE) and send the cell group configuration to the CU 172, which in turn can include a radio bearer configuration (e.g., RadioBearerConfig IE) and the cell group configuration in the handover command message.

In some implementations, if the S-MN 104 is a gNB, the handover command message can be an RRCReconfiguration message, the handover complete message can be an RRCReconfigurationComplete message, and the RRC' reconfiguration message and the RRC' reconfiguration complete message can be an RRCReconfiguration message and an RRCReconfigurationComplete message, respectively.

In some implementations, if the S-MN 104 is an eNB or an ng-eNB, the handover command message can be an RRC ConnectionReconfiguration message, the handover complete message can be an RRCConnectionReconfiguration-Complete message, and the RRC reconfiguration message and the RRC reconfiguration complete message can be an RRCConnectionReconfiguration message and an RRCConnectionReconfigurationComplete message, respectively.

Turning now to FIG. 3B, according to a DAPS handover scenario 300B, the base station 104 operates as an S-MN for the UE 102, and the base station 106B operates as a T-MN for the UE 102, similar to the DAPS handover scenario 300A of FIG. 3A. Whereas in FIG. 3A the UE 102 successfully performs a DAPS handover to the T-MN 106B prior to stopping and releasing the power coordination configuration, in FIG. 3B the UE 102 fails to successfully perform the DAPS handover.

Initially, the UE 102 communicates 302B data with the S-MN 104 by using an S-MN configuration, similar to event 302A. Later in time, the S-MN 104 determines 304B to initiate DAPS handover for the T-MN 106B and the UE 102 to communicate, similar to event 304A.

After determining 304B to initiate DAPS handover, the S-MN 104 sends 312B a Handover Request message to the T-MN 106B, the T-MN 106B generates 314B a handover command message for DAPS handover that includes a T-MN configuration including a DAPS power coordination configuration, the T-MN 106B sends 316B the handover command message in a Handover Request Acknowledge message to the S-MN 104, and the S-MN 104 transmits 318B the handover command message to the UE 102, similar to events 312A, 314A, 316A, and 318A, respectively.

In response to receiving 318B the handover command message, the UE 102 applies 352B the DAPS power coordination configuration, and continues 320B communicating with the S-MN 104 using the S-MN configuration while the UE 102 attempts to handover to the T-MN 106B in accordance with the handover command message, similar to events 352A and 320A, respectively.

After the UE 102 either applies 352B the DAPS power coordination configuration or continues 320B communicating with the S-MN 104, the UE 102 determines 321B a DAPS handover failure, i.e., the UE 102 fails to perform DAPS handover to the T-MN 106B using a random access procedure similar to 322A, e.g., within a certain time duration. In response to the determination at event 321B, the UE 102 stops 354B applying the DAPS power coordination configuration and releases the DAPS power coordination configuration. In some implementations, the RRC controller 152 can send an indication to the PHY 202 of the UE 102, causing the PHY 202 to stop applying the DAPS power coordination configuration. In some implementations, the UE 102 releases the T-MN configuration received in event 318B in response to the determination at event 321B.

If a radio link between the UE 102 and the S-MN 104 is available (i.e., no radio link failure occurs on the radio link between the UE 102 and the S-MN 104), the UE 102 can transmit 342B to the S-MN 104, e.g., via SRB1, a failure information message (e.g., FailureInformation) indicating the DAPS handover failure with respect to the T-MN 106B.

The UE 102 can then perform 348B an RRC re-establishment procedure on cell 126B or another cell with the T-MN 106B, in some implementations. If the radio link between the UE 102 and the S-MN 104 is not available, the UE 102 does not transmit the failure information message to the S-MN 104. To perform the RRC re-establishment procedure, the UE 102 transmits an RRC re-establishment request message to the T-MN 106B, which in turn transmits an RRC re-establishment message to the UE 102. The UE 102 can transmit an RRC re-establishment complete message to the T-MN 106B in response to the RRC re-establishment message.

Because the UE 102 has stopped 354B applying the DAPS power coordination configuration and released the DAPS power coordination configuration, the UE 102 advantageously will not unnecessarily restrict its maximum uplink power according to the DAPS power coordination configuration (e.g., CP1 and/or CP2) when communicating with the S-MN 104, such as when transmitting 342B the failure information message to the S-MNB 104, and/or when communicating with the T-MN 106B, such as during or after performing 348B the RRC re-establishment procedure with the T-MN 106B.

In some implementations, the T-MN 106B can release 356B the DAPS power coordination configuration some time after generating or transmitting the handover command message to the S-MN 104. In some implementations, the T-MN 106B can release the DAPS power coordination configuration if the UE 102 does not successfully handover to the T-MN 106B within a time duration. In other implementations, the T-MN 106B can release the DAPS power coordination configuration in response to the RRC re-establishment procedure.

In some implementations, the UE 102 can perform the RRC re-establishment procedure with the S-MN 104 via cell 122 or cell 124 instead of with the T-MN 106B. Thus, because the UE 102 has stopped 354B applying the DAPS power coordination configuration and released the DAPS power coordination configuration, the UE 102 is also not restricted by the DAPS power coordination configuration parameter CP1 during and after performing the RRC re-establishment procedure with the S-MN 104.

In some implementations, if the T-MN 104 is a gNB, the RRC re-establishment request message, the RRC re-establishment message, and the RRC re-establishment complete message can be an RRCReestablishmentRequest message, an RRC Reestablishment message, and an RRCReestablishmentComplete message, respectively. If the T-MN 106B is an eNB or an ng-eNB, the RRC re-establishment request message, the RRC re-establishment message, and the RRC re-establishment complete message can be an RRCConnectionReestablishmentRequest message, an RRCConnectionReestablishment message, and an RRCConnectionReestablishmentComplete message, respectively.

Although FIGS. 3A and 3B depict the DAPS handover scenarios 300A and 300B occurring between two base stations (e.g., the base stations 104, 106B) with respect to the UE 102, in some implementations, the DAPS handover scenarios 300A and 300B can be carried out within a single base station (e.g., the S-MN 104) with respect to the UE 102. In such scenarios, messages exchanged between the S-MN 104 and T-MN 106B (e.g., events 312A, 312B, 316A, 316B, 328A) can be omitted, and the events performed or otherwise involving the T-MN 106B (e.g., events 314A, 314B, 322A, 324A, 326A, 332A, 356A, 356B, 334A, 348B) can be performed or otherwise involve the S-MN 104.

Referring now to FIG. 4A, according to a DAPS PSCell change scenario 400A, the base station 104 operates as an MN for the UE 102, the base station 106A operates as an S-SN for the UE 102, and the base station 106B operates as a T-SN for the UE 102.

Initially, the UE 102 in DC communicates 402A data with the MN 104 via PCell 124 by using an MN configuration, and with the S-SN 106A via PSCell 126A by using an S-SN configuration.

Later in time, the MN 104 determines 404A to initiate DAPS PSCell change involving an SN change (i.e., MN-initiated DAPS SN addition or change procedure) for the T-SN 106B and the UE 102 to communicate via a T-PSCell 126B, e.g., blindly or in response to detecting a suitable event, similar to those described with respect to FIG. 3A, or in response to an SN Change Required message received from the S-SN 106A.

In response to the determination at event 404A, the MN 104 sends 412A an SN Addition Request message to the T-SN 106B. In response, the T-SN 106B generates 414A a T-SN configuration for a DAPS PSCell change, and sends 416A the T-SN configuration in an SN Addition Request Acknowledge message to the MN 104. In other implementations, in response to the determination at event 404A, the MN 104 can send an SN Release Request message (or alternatively, an SN Modification Request message) to the S-SN 106A, to request the S-SN 106A to perform DAPS PSCell change or to continue communicating with the UE 102, respectively. The S-SN 106A can then send an SN Release Request Acknowledge message or an SN Modification Request Acknowledge message to the MN 104 in response to the SN Release Request message or SN Modification Request message, respectively. In other implementations, the MN 104 may not send the SN Release Request message (or alternatively, the SN Modification Request message) to the S-SN 106A, causing the S-SN 106A to continue communicating with the UE 102 as the S-SN 106A is unaware of the DAPS SN change and therefore behaves as usual. In yet other implementations, if the MN 104 made the determination at event 404A in response to the SN Change Required message, the MN 104 can send an SN Change Confirm message to the S-SN 106A, to request the S-SN 106A to perform DAPS PSCell change or to continue communicating with the UE 102.

In response to receiving 416A the T-SN configuration from the T-SN 106B, the MN 104 generates a DAPS power coordination, and includes both the T-SN configuration and the DAPS power coordination configuration in an RRC container message, and transmits 417A the RRC container message to the UE 102. In response to receiving 417A the DAPS power coordination configuration, the UE 102 applies 452A the DAPS power coordination configuration. In some implementations, the RRC controller 152 can send DAPS power coordination configuration parameters in the DAPS power coordination configuration to the PHY 202 of the UE 102, which in turn applies the DAPS power coordination configuration parameters. In response to receiving 417A the RRC container message, the UE 102 also transmits 418A an RRC container response message including an RRC reconfiguration complete message to the MN 104. In some implementations, the MN 104 can send 419A an SN Reconfiguration Complete message to the T-SN 106B in response to the RRC' container response message. The events 404A, 412A, 414A, 416A, 417A, 452A, 418A, and 419A are collectively referred to in FIG. 4A as the DAPS PSCell change preparation procedure 460A.

In some implementations, rather than generating the DAPS power coordination configuration at event 417A, the MN 104 receives the DAPS power coordination configuration from the T-SN 106B in the SN Addition Request Acknowledge message. In one such implementation, the T-SN 106B can generate and include the DAPS power coordination configuration (e.g., a DAPS-PowerCoordinationInfo-r16 IE or DAPS-Configuration-r16 IE) in the T-SN configuration or in the SN Addition Request Acknowledge message. In other implementations, the S-SN 106A can generate and send the DAPS power coordination configuration to the MN 104 in the SN Change Required message or in an SN Modification Request Acknowledge message.

In some implementations, the T-SN 106B can send DAPS PSCell change configuration(s) (e.g., daps-Config field(s)) indicating particular DRB(s) are DAPS bearer(s) in the SN Addition Request Acknowledge message or in the T-SN configuration to the MN 104, which in turn can include the DAPS PSCell change configuration(s) in the RRC container message. The DAPS PSCell change configuration enables the UE 102 to use a DAPS (e.g., DAPS 200) for the DAPS bearer(s) to communicate with the S-SN 106A (using the S-SN configuration) and T-SN 106B (during and after a successful DAPS PSCell change). As such, in response to receiving 417A the RRC container message, the UE 102 and the S-SN 106A continue 420A communicating with each other (i.e., in DC with the MN 104) by using the S-SN configuration while the UE 102 attempts to perform DAPS PSCell change to the T-SN 106B via T-PSCell 126B in accordance with the T-SN configuration.

In attempting to perform the DAPS PSCell change, the UE 102 initiates 422A a random access procedure with the T-SN 106B via T-PSCell 126B, e.g., by using one or more random access configurations in the T-SN configuration. After the T-SN 106B identifies the UE 102 during the random access procedure (e.g., the UE 102 succeeds the contention resolution), the UE 102 communicates 426A in DC with the MN 104 via PCell 124 and T-SN 106B via T-PSCell 126B by using configurations in the T-SN configuration, while continuing to communicate with the S-SN 106A via PSCell 126A.

The MN 104 can send 428A a UE Context Release message to the S-SN 106A after receiving 418A the RRC container response message. The S-SN 106A stops 430A communicating with the UE 102 in response to or after receiving the UE Context Release message. Alternatively, the S-SN 106A stops 430A communicating with the UE 102 if the S-SN 106A does not receive DL data packets from the CN 110 (e.g., S-GW 112 or UPF 162).

The DAPS PSCell change configuration(s) and/or the DAPS power coordination configuration enable the UE 102 to continue communicating with the S-SN 106A while simultaneously communicating with the T-SN 106B. As the UE 102 no longer needs to use the DAPS to continue communicating with the S-SN 106A after successfully performing the DAPS PSCell change, the UE 102 can stop 454A applying the DAPS power coordination configuration and release the DAPS power coordination configuration. In this way, the UE 102 will not unnecessarily restrict its maximum uplink power according to the DAPS power coordination configuration when communicating with the T-SN 106B, thereby reducing the risk of radio link failure with the T-SN 106B. In some implementations, the T-SN 106B can transmit 432A an RRC reconfiguration message that includes a DAPS release indicator to the UE 102, e.g., via an SRB (e.g., SRB3) between the UE 102 and the T-SN 106B or via the MN 104. In response to the RRC reconfiguration message, the UE 102 can stop 454A applying the DAPS power coordination configuration and release the DAPS power coordination configuration. In some implementations, the RRC controller 152 can send an indication to the PHY 202 of the UE 102, causing the PHY 202 to stop applying 454A the DAPS power coordination configuration.

In some implementations, the T-SN 106B can also release 456A the DAPS power coordination configuration, because the UE 102 no longer needs to use the DAPS power coordination configuration and/or the UE 102 released the DAPS power coordination configuration. That is, the T-SN 106B can release the DAPS power coordination configuration after including the DAPS power coordination configuration in the T-SN configuration in event 414A.

Subsequent to event 454A, the UE 102 can transmit 434A an RRC reconfiguration complete message to the T-SN 106B via the SRB (e.g., SRB3) between the UE 102 and the T-SN 106B or via the MN 104, and stop 436A communicating with the S-SN 106A. In some implementations, in response to the DAPS release indicator, a RF chip, receiver, or a transceiver of the UE 102 used to communicate with the S-SN 106A during the DAPS PSCell change can enter into low power consumption mode, sleep mode, or be turned off entirely if the DAPS PSCell change is an inter-frequency DAPS PSCell change.

In some implementations, the DAPS power coordination configuration includes one or more of the following DAPS power coordination configuration parameters: the maximum total transmission power (or value thereof) that the UE 102 can use for uplink communication with the S-SN 106A during DAPS PSCell change (interchangeably referred to as "CP4"), the maximum total transmission power (or value thereof) that the UE 102 can use for uplink communication with the T-SN 106B during DAPS PSCell change (interchangeably referred to as "CP5"), and/or an uplink power sharing mode that the UE 102 uses during DAPS PSCell change (interchangeably referred to as "CP6"). The DAPS power coordination configuration parameters can be included in fields or IEs of the DAPS power coordination configuration, in some implementations.

After the UE 102 (e.g., PHY 202) applies the DAPS power coordination configuration during the DAPS PSCell change, the UE 102 (e.g., PHY 202) can determine (or manage or coordinate) its uplink transmission power for transmissions to the S-SN 106A and its uplink transmission power for transmissions to the T-SN 106B according to the DAPS power coordination configuration, e.g., according to 3GPP specification 38.331 v16.1.0 or 36.331 v16.1.0. In some implementations, if the uplink power sharing mode as designated in CP6 is a first mode (e.g., semi-static mode 1), the UE 102 manages its uplink transmission power to not exceed CP4 while transmitting 420A to the S-SN 106A, and to not exceed CP5 while transmitting 426A to the T-SN 106B. In other implementations, if the uplink power sharing mode is a second mode (e.g., semi-static mode 2 or dynamic mode), and a first uplink transmission to the S-SN 106A partially or completely overlaps with a second uplink transmission to the T-SN 106B, the UE 102 manages uplink transmission power of the first uplink transmission and the second uplink transmission to not exceed CP4 and CP5, respectively. If the uplink power sharing mode is the second mode and the first uplink transmission to the S-SN 106A does not overlap with the second uplink transmission to the T-MN 106B, the UE 102 manages uplink transmission power of the first uplink transmission and the second uplink transmission to not exceed respective maximum total transmission power values other than those included in the DAPS power coordination configuration.

In some implementations, the S-SN 106A and T-SN 106B can provide these respective maximum total transmission power values to the UE 102 in respective non-DAPS configuration(s) via SRB 3 or via MN 104. The S-SN 106A can send non-DAPS configuration(s) to the UE 102 in a dedicated message (e.g., RRC reconfiguration message), and the T-SN 106B can send non-DAPS configuration(s) to the UE 102 in a dedicated message (e.g., RRC reconfiguration message), in some implementations. In other implementations, the MN 104 can directly provide maximum total transmission power values to the UE 102 in non-DAPS configuration(s) in a dedicated message (e.g., RRC' reconfiguration message).

In some implementations, the T-SN 106B receives a configuration restriction for the DAPS PSCell change from the MN 104 in the SN Addition Request message. The T-SN 106B can generate the DAPS power coordination configuration according to the configuration restriction. In one implementation, the MN 104 can generate and include preferred power coordination configuration parameters in the configuration restriction. In another implementation, the MN 104 can receive the preferred power coordination configuration parameters from the S-SN 106A and include them in the configuration restriction. In any event, the T-SN 106B can include such preferred parameters in the DAPS power coordination configuration. In one implementation, the MN 104 or the S-SN 106A can determine the preferred parameters based on the UE capability of the UE 102. For example, the UE capability can indicate or include a UE power class and/or DAPS power sharing mode(s) supported by the UE 102. If the UE capability includes or otherwise indicates supported uplink power sharing mode(s), the MN 104 can set the preferred uplink sharing mode to one of the supported uplink power sharing mode(s). If the UE 102 is configured to implement all uplink sharing modes supported by the RAN 105, the MN 104 or S-SN 106A can select a particular preferred uplink sharing mode according to at least one of the PCP1 and/or PCP2 parameters described above with respect to FIG. 3A.

Similarly, in another implementation, the MN 104 or the T-SN 106B can determine some or all of the DAPS power coordination configuration parameters in the DAPS power coordination configuration based on the preferred power coordination configuration parameters and/or the UE capability of the UE 102. If the UE capability includes or otherwise indicates supported uplink power sharing mode(s), the MN 104 or T-SN 106B can set the uplink sharing mode to one of the supported uplink power sharing mode(s) or the preferred uplink sharing mode provided by the MN 104 or the S-SN 106A. If the UE 102 is configured to implement all uplink sharing modes supported by the RAN 105, the T-SN 106B can select a particular uplink sharing mode according to PCP1, PCP2, and/or the same preferred power coordination configuration parameters provided by the MN 104 or the S-SN 106A.

In some implementations, after successfully completing 422A the random access procedure, the UE 102 can start transmitting UL data PDUs to the T-SN 106B via the cell 126B, stop transmitting and retransmitting UL data PDUs to the S-SN 106A, stop transmitting control signals on PUCCH (s) to the S-SN 106A, stop transmitting new UL data PDUs to the S-SN 106A while continuing to retransmit UL data PDU(s) to the S-SN 106A, continue DL communication with the S-SN 106A, and/or keep transmitting control signals to the S-SN 106A until event 432A occurs or the DAPS release timer at the UE 102 expires, as described above with respect to FIG. 3A. The T-SN 106B can configure the timer value for the DAPS release timer in the RRC reconfiguration message or in the T-SN configuration, in some implementations. In other implementations, the MN 104 configures a timer value for the DAPS release timer in the RRC container message. Upon receiving the timer value, the UE 102 starts the DAPS release timer to count the timer value. When the DAPS release timer expires, the UE 102 stops 436A communicating with the S-SN 106A. In other implementations, the UE 102 uses a predetermined timer value if the MN 104 or T-SN 106B does not provide the timer value to the UE 102.

In some implementations, the T-SN 106B includes multiple configuration parameters in the T-SN configuration to configure radio resources for the UE 102 to communicate with the T-SN 106B via the T-PSCell 126B. The multiple configuration parameters can configure physical layer, medium access control (MAC) layer, and radio link control bearers. The DAPS PSCell change configuration can be associated or specific to a radio bearer (e.g., DRB). For example, the T-SN 106B can include the DAPS PSCell change configuration in an RB configuration (e.g., Radio-BearerConfig IE, DRB-ToAddModList IE or DRB-ToAddMod IE) in the SN Addition Request Acknowledge message at event 416A, and the MN 104 can include the RB configuration in the RRC container message at event 417A. The S-SN 106A can also configure the particular DRB and transmit an RB configuration configuring the particular DRB to the UE 102.

In some implementations, the T-SN 106B may not configure an SCell for the UE 102 in the T-SN configuration. The T-SN 106B can later transmit RRC reconfiguration message(s) to the UE 102 to configure SCell(s) of the T-SN 106B. In response, the UE 102 can transmit an RRC reconfiguration complete message to the T-SN 106B via the T-PSCell 126B or a configured SCell for each of the RRC reconfiguration message(s).

In some implementations, the SN configuration (i.e., the S-SN configuration or T-SN configuration) can include a CellGroupConfig IE. The SN configuration can be an RRCReconfiguration message, RRCReconfiguration-IEs, or the CellGroupConfig IE conforming to 3GPP TS 38.331, or an RRC ConnectionReconfiguration message or RRC ConnectionReconfiguration-IEs conforming to 3GPP TS 36.331. In some implementations, the SN configuration can include configurations in the CellGroupConfig IE, RRCReconfiguration-IEs, or RRCConnectionReconfiguration-IEs.

If the S-SN 106A is a gNB, the T-SN configuration or the RRC reconfiguration message can be an RRCReconfiguration message, and the RRC' reconfiguration complete message can be an RRCReconfigurationComplete message as defined in 3GPP TS 38.331. If the S-SN 106A is an ng-eNB, the T-SN configuration or the RRC' reconfiguration message can be an RRC ConnectionReconfiguration message, and the RRC reconfiguration complete message can be an RRC-ConnectionReconfigurationComplete message as defined in 3GPP TS 36.331.

Turning now to FIG. 4B, according to a DAPS PSCell change scenario 400B, the base station 104 operates as an MN for the UE 102, the base station 106A operates as an S-SN, and the base station 106B operates as a T-SN for the UE 102, similar to the DAPS PSCell change scenario 400A of FIG. 4A. Whereas in FIG. 4A the UE 102 successfully performs a DAPS PSCell change to the T-SN 106B prior to stopping and releasing the power coordination configuration, in FIG. 4B the UE 102 fails to successfully perform the DAPS PSCell change.

Initially, the UE 102 in DC communicates 402B data with the MN 104 via PCell 124 by using an MN configuration, and with the S-SN 106A via PSCell 126A by using an S-SN configuration, similar to event 402A.

Later in time, the MN 104, S-SN 106A, and T-SN 106B collectively perform 460B a DAPS PSCell change preparation procedure, similar to event 460A. The UE 102 and the S-SN 106A continue 420B communicating with each other (i.e., in DC with the MN 104), similar to event 420A, by using the S-SN configuration while the UE 102 attempts to perform DAPS PSCell change to the T-SN 106B via T-PS-Cell 126B in accordance with a T-SN configuration received in event 460B.

After the UE 102 either applies the DAPS power coordination configuration during the SN change procedure in event 460B, or continues 420B communicating with the S-SN 106A by using the S-SN configuration, the UE 102 determines 421B a DAPS PSCell change failure, i.e., the UE 102 fails to perform DAPS PSCell change to the T-SN 106B, e.g., within a certain time duration. In response to the determination at event 421B, the UE 102 stops 454B applying the DAPS power coordination configuration and releases the DAPS power coordination configuration. In some implementations, the RRC controller 152 can send an indication to the PHY 202 of the UE 102, causing the PHY 202 to stop applying the DAPS power coordination configuration. In some implementations, the UE 102 releases the T-SN configuration received in event 460B in response to the determination at event 421B.

If a radio link between the UE 102 and the S-SN 106A is available (i.e., no radio link failure occurs on the radio link between the UE 102 and the S-SN 106A) and an SRB (e.g., SRB3) between the UE 102 and the S-SN 106A is not available, the UE 102 can transmit, to the MN 104, e.g., via an SRB (e.g., SRB1), either a failure information message (e.g., FailureInformation) at event 452B or an SCG failure information message (e.g., SCGFailureInformation) at event 472B indicating the DAPS PSCell change failure with respect to the T-SN 106B. In one implementation, after receiving 452B the failure information message from the UE 102 in an RRC container message (e.g., ULInformation-TransferMRDC), the MN 104 extracts the failure information message from the RRC container message and sends 453B the failure information message to the S-SN 106A in an RRC Transfer message. In another implementation, the MN 104 does not send the failure information message to the S-SN 106A.

If a radio link between the UE 102 and the S-SN 106A is available and an SRB (e.g., SRB3) between the UE 102 and the S-SN 106A is available, the UE 102 can transmit, to the S-SN 106A via the available SRB, the failure information message indicating the DAPS PSCell change failure with respect to the T-SN 106B at event 455B. In response, the S-SN 106A can send an SN message (e.g., SN Modification Required message) to the MN 104 to inform the MN 104 of the DAPS PSCell change failure.

If the radio link between the UE 102 and the S-SN 106A is not available, the UE 102 can transmit 472B the SCG failure information message to the MN 104 to inform the MN 104 of the DAPS PSCell change failure.

Because the UE 102 has stopped 454B applying the DAPS power coordination configuration and released the DAPS power coordination configuration, the UE 102 advantageously will not unnecessarily restrict its maximum uplink power according to the DAPS power coordination configuration when communicating with the MN 104, such as when transmitting the failure information message or the SCG failure information message, and/or when communicating with the S-SN 106A, such as when transmitting the failure information message.

In some implementations, the T-SN 106B can release 456B the DAPS power coordination configuration after generating or transmitting the T-SN configuration to the MN 104. In some implementations, the T-SN 106B can release the DAPS power coordination configuration if the UE 102 does not successfully perform DAPS PSCell change to the T-SN 106B within a time duration. In other implementations, the MN 104 can release the DAPS power coordination configuration in response to receiving 452B the failure information message or in response to receiving the SN message from the S-SN 106A informing the DAPS PSCell change failure.

Although FIGS. 4A and 4B depict the DAPS PSCell change scenarios 400A and 400B occurring between two SNs (e.g., the base stations 106A, 106B) with respect to the UE 102, in some implementations, the DAPS PSCell change scenarios 400A and 400B can be carried out within a single SN (e.g., the S-SN 106A) with respect to the UE 102. In such scenarios, messages exchanged between the MN 104 and T-SN 106B (e.g., events 412A, 416A, 419A) can be omitted, and events performed or otherwise involving the T-SN 106B (e.g., 414A, 419A, 422A, 426A, 432A, 456A, 434A, 460B) can be performed or otherwise involve the S-SN 106A.

FIG. 5A is a flow diagram depicting an example method 500A implemented in a user device (e.g., UE 102) for applying and later releasing a DAPS power coordination configuration when switching from a source base station (e.g., S-MN 104, S-SN 106A) to a target base station (e.g., T-MN 106B, T-SN 106B).

At block 502A, a user device receives, from a source base station, a first message including a DAPS power coordination configuration for DAPS operation with the source base station and a target station (e.g., in any one of events 318A, 417A). In accordance with the DAPS operation, the user device (e.g., via DAPS 200) can perform a DAPS handover or DAPS PSCell change. The first message can be a handover command message or an RRC container message, in some implementations.

At block 504A, the user device applies the DAPS power coordination configuration for communicating with the source base station and the target base station (e.g., in any one of events 352A, 452A). In accordance with the DAPS power coordination configuration, the user device restricts respective maximum total transmission uplink power when communicating with the source base station and the target base station.

At block 506A, the user device receives, from the target base station, a second message indicating release of the DAPS operation (e.g., in any one of events 332A, 432A). Accordingly, the target base station explicitly provides the second message to the user device to indicate that the user device should stop communicating with the source base station, and continue communicating with the target base station. The second message can be an RRC reconfiguration message, in some implementations.

At block 508A, in response to receiving the second message, the user device disconnects from the source base station (i.e., stops communicating with the source base station), stops applying the DAPS power coordination configuration, and releases the DAPS power coordination configuration (e.g., in any one of events 336A, 354A, 436A, 454A). In releasing the DAPS power coordination configuration, the user device will not continue to restrict its maximum uplink power according to the DAPS power coordination configuration when communicating with the target base station after successfully performing the DAPS handover or DAPS PSCell change. Because DAPS power restrictions have been removed, the user device can increase its uplink power up to its maximum uplink power, and the user device can reduce the chances of radio link failure with the target base station.

FIG. 5B is a flow diagram depicting another example method 500B implemented in a user device (e.g., UE 102) for applying and later releasing a DAPS power coordination configuration when switching from a source base station (e.g., S-MN 104, S-SN 106A) to a target station (e.g., T-MN 106B, T-SN 106B). Whereas in FIG. 5A the user device releases the DAPS power coordination configuration in response to an explicit message (e.g., RRC reconfiguration message) from the target base station, in FIG. 5B the UE 102 releases the DAPS power coordination configuration after performing a random access procedure with the target base station.

At block 502B, a user device receives, from a source base station, a first message including a DAPS power coordination configuration for DAPS operation with the source base station and a target station (e.g., in any one of events 318A, 417A), similar to block 502A.

At block 504B, the user device applies the DAPS power coordination configuration for communicating with the source base station and the target base station (e.g., in any one of events 352A, 452A), similar to block 504A.

At block 506B, the user device performs a random access procedure with the target base station in response to the first message (e.g., in any one of events 322A, 422A).

At block 508B, after performing the random access procedure, the user device stops applying the DAPS power coordination configuration and releases the DAPS power coordination configuration (e.g., in any one of events 354A, 454A).

At block 510B, the user device receives a second message indicating release of the DAPS operation (e.g., event 332A or 432A), similar to block 506A.

At block 512B, the user device disconnects from the source base station (i.e., stops communicating with the source base station) in response to the second message (e.g., in any one of events 336A, 436A), thereby successfully performing the DAPS operation.

FIG. 5C is a flow diagram depicting another example method 500C implemented in a user device (e.g., UE 102) for applying and releasing a DAPS power coordination configuration when switching from a source base station (e.g., S-MN 104, S-SN 106A) to a target station (e.g., T-MN 106B, T-SN 106B). Whereas in FIGS. 5A and 5B the user device successfully performs a DAPS handover or DAPS PSCell change to the target base station, in FIG. 5C the user device fails to successfully perform the DAPS handover or DAPS PSCell change.

At block 502C, a user device receives, from a source base station, a first message including a DAPS power coordination configuration for DAPS operation with the source base station and a target station (e.g., in any one of events 318B, 460B), similar to blocks 502A and 502B.

At block 504C, the user device applies the DAPS power coordination configuration for communicating with the source base station and the target base station (e.g., in any one of events 352B, 460B), similar to blocks 504A and 504B.

At block 506C, the user device determines a failure (e.g., a radio link failure) while performing the DAPS operation (e.g., in any one of events 321B, 421B). That is, the user device fails to perform either DAPS handover or DAPS PSCell change to the target base station.

At block 508C, in response to determining the failure, the user device stops applying the DAPS power coordination configuration and releases the DAPS power coordination configuration (e.g., in any one of events 354B, 454B). In this way, if the user device later performs an RRC re-establishment procedure with the source base station or the target source base station for example, the user device is not restricted by the maximum uplink power as designated in the DAPS power coordination configuration during and after performing the RRC re-establishment procedure with the source base station or the target base station. Because the user device can increase its uplink power beyond the maximum uplink power indicated in the DAPS power coordination configuration, the user device can decrease the chances of radio link failure with the source base station or the target base station.

FIG. 6 is a flow diagram depicting an example method 600 implemented in a RAN (e.g., RAN 105) for providing a DAPS power coordination configuration to a user device (e.g., UE 102) described with respect to FIGS. 5A, 5B, and 5C, and later releasing the DAPS power coordination configuration.

At block 602, a RAN transmits, to a user device, a first message including a DAPS power coordination configuration for DAPS operation with a source base station and a target base station of the RAN (e.g., in any one of events 318A, 318B, 417A, 460B). In accordance with the DAPS operation, the user device (e.g., via DAPS 200) can perform a DAPS handover or DAPS PSCell change. The first message can be a handover command message or an RRC container message, in some implementations. The first message can also include multiple configuration parameters to configure radio resources, so that the user device can use these multiple configuration parameters to communicate with the RAN during and after successfully performing the DAPS handover or DAPS PSCell change.

At block 604, after transmitting the first message, the RAN releases the DAPS power coordination configuration (e.g., in any one of events 356A, 356B, 456A, 456B). In some implementations, the RAN releases the DAPS power coordination configuration after transmitting, to the user device, the first message and a second message (e.g., RRC' reconfiguration message) to request the user device to disconnect from the source base station (e.g., in any one of events 332A, 432A). In another implementation, the RAN releases the DAPS power coordination configuration after transmitting the first message to the user device and after receiving a third message (e.g., a failure information message) from the user device (e.g., in event 342B). In some implementations, the RAN may retain the multiple configuration parameters provided to the user device in the first message.

Next, FIG. 7A illustrates an example method 700A for managing a power coordination configuration when performing a DAPS procedure, which can be implemented in a suitable UE such as the UE 102.

At block 702A, the UE receives, from a RAN, a power coordination configuration for application by the UE to constrain uplink power when communicating with a source cell and a target cell of the RAN (e.g., events 318A, 318B, 460A, 460B).

At block 704A, the UE initiates the DAPS procedure in accordance with the power coordination configuration (e.g., events 320A, 320B, 420A, 420B).

At block 706A, in response to detecting a trigger condition, the UE releases the power coordination configuration (e.g., events 354A, 354B, 454A, 454B). In some implementations, the UE releases the power coordination configuration when the UE connects to the target cell when performing the DAPS procedure. In other implementations, the UE releases the power coordination configuration when the UE receives, from the RAN via the target cell, an indication the UE is to release the power coordination configuration. In yet other implementations, the UE releases the power coordination configuration when the UE fails to connect to the target cell when performing the DAPS procedure.

Next, FIG. 7B illustrates an example method 700B for managing a power coordination configuration when performing a DAPS procedure with a UE (e.g., UE 102), which can be implemented in a suitable RAN such as the RAN 105.

At block 702B, the RAN determines that the UE is to perform the DAPS procedure to connect to a target cell and disconnect from a source cell after connecting to the target cell in accordance with the power coordination configuration (e.g., events 304A, 304B, 460A, 460B).

At block 704B, the RAN transmits, to the UE, the power coordination configuration for application by the UE to constrain uplink power when communicating with the source cell and the target cell (e.g., events 318A, 318B, 460A, 460B).

At block 706B, in response to detecting a trigger condition, the RAN causes the UE to release the power coordination configuration (e.g., events 332A, 332B, 432A, 432B). In some implementations, the RAN causes the UE to release the power coordination configuration when the RAN determines that the UE is connected to the RAN via the target cell after performing the DAPS procedure. In other implementations, the RAN causes the UE to release the power coordination configuration when the RAN transmits, to the UE via the target cell, an indication the UE is to release the power coordination configuration.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IOT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Example 1. A method in a user equipment (UE) for managing a power coordination configuration when performing a dual active protocol stack (DAPS) procedure, the method comprising: receiving, by the processing hardware and from a radio access network (RAN), a power coordination configuration for application by the UE to constrain uplink power when communicating with a source cell and a target cell of the RAN; initiating, by the processing hardware, the DAPS procedure in accordance with the power coordination configuration; and in response to detecting a trigger condition, releasing, by the processing hardware, the power coordination configuration.

Example 2. The method of example 1, wherein the trigger condition includes: connecting to the target cell when performing the DAPS procedure.

Example 3. The method of examples 1 or 2, wherein the trigger condition includes: receiving, from the RAN via the target cell, an indication the UE is to release the power coordination configuration.

Example 4. The method of example 1, wherein the trigger condition includes: failing to connect to the target cell when performing the DAPS procedure.

Example 5. The method of example 4, further comprising: re-establishing a radio connection between the UE and the RAN.

Example 6. The method of example 4 or 5, further comprising: transmitting, to the RAN via the source cell, an indication that the UE failed to connect to the target cell.

Example 7. The method of any of the preceding examples, wherein: the DAPS procedure is a DAPS handover procedure.

Example 8. The method of example 7, wherein the DAPS handover procedure causes the UE to hand over between: (i) a first MN and a second MN when the UE operates in SC; (ii) a first SN and a second SN when the UE operates in DC; (iii) the source cell of an MN and the target cell of an MN when the UE operates in SC; or (iv) a first distributed unit (DU) of a distributed base station and a second DU of the distributed base station.

Example 9. The method of any of examples 1-6, wherein: the DAPS procedure is a DAPS primary secondary cell (PSCell) change procedure.

Example 10. The method of example 9, wherein the DAPS PSCell change procedure causes the UE to hand over between: (i) a first SN and a second SN; (ii) the source cell of an SN and the target cell of an SN; or (iii) a first distributed unit (DU) of a distributed base station and a second DU of the distributed base station.

Example 11. A method in a RAN for managing a power coordination configuration when performing a DAPS procedure with a UE, the method comprising: determining, by processing hardware, that the UE is to perform the DAPS procedure to connect to a target cell and disconnect from a source cell after connecting to the target cell in accordance with the power coordination configuration; transmitting, by the processing hardware to the UE, the power coordination configuration for application by the UE to constrain uplink power when communicating with the source cell and the target cell; and in response to detecting a trigger condition, causing the UE to release the power coordination configuration.

Example 12. The method of example 11, wherein the trigger condition includes: determining that the UE is connected to the RAN via the target cell after performing the DAPS procedure.

Example 13. The method of examples 11 or 12, wherein the trigger condition includes: transmitting, to the UE via the target cell, an indication the UE is to release the power coordination configuration.

Example 14. The method of any one of examples 11-13, wherein transmitting the power coordination configuration includes transmitting the power coordination configuration to the UE in a handover command message or a RRC container message.

Example 15. The method of any one of examples 11-14, further comprising: after transmitting the power coordination configuration, releasing, by the processing hardware, the power coordination configuration at the RAN.

Example 16. The method of example 15, wherein releasing the power coordination configuration includes releasing the power coordination configuration in response to receiving a failure information message from the UE.

Example 17. The method of any one of examples 11-16, wherein: the DAPS procedure is a DAPS handover procedure.

Example 18. The method of any one of examples 11-16, wherein: the DAPS procedure is a DAPS primary secondary cell (PSCell) change procedure.

What is claimed is:

1. A method in a user equipment (UE) for managing a power coordination configuration when performing a dual active protocol stack (DAPS) procedure, the method comprising:
   receiving, by the UE and from a radio access network (RAN), a power coordination configuration for application by the UE to constrain uplink power when communicating with a source cell and a target cell of the RAN;
   initiating, by the UE, the DAPS procedure in accordance with the power coordination configuration; and
   in response to detecting a failure when performing the DAPS procedure, releasing, by the UE, the power coordination configuration and disconnecting from the source cell.

2. The method of claim 1, further comprising connecting, by the UE, to the target cell when performing the DAPS procedure.

3. The method of claim 1, further comprising receiving, by the UE from the RAN and via the target cell, an indication that the UE is to release the power coordination configuration.

4. The method of claim 1, wherein the failure includes a failure of the UE to connect to the target cell when performing the DAPS procedure.

5. The method of claim 1, further comprising re-establishing a radio connection between the UE and the RAN.

6. The method of claim 4, further comprising transmitting, by the UE to the RAN via the source cell, an indication that the UE failed to connect to the target cell.

7. The method of claim 1, wherein the DAPS procedure is a DAPS handover procedure or a DAPS primary secondary cell (PSCell) change procedure.

8. A method in a RAN for managing a power coordination configuration when performing a dual active protocol stack (DAPS) procedure with a UE, the method comprising:
   determining, by the RAN, that the UE is to perform the DAPS procedure to connect to a target cell and disconnect from a source cell after connecting to the target cell in accordance with the power coordination configuration;
   transmitting, by the RAN to the UE, the power coordination configuration for application by the UE to constrain uplink power when communicating with the source cell and the target cell; and
   in response to receiving, by the RAN and from the UE, an information message about a failure while performing the DAPS procedure, causing the source cell to release the power coordination configuration.

9. The method of claim 8, wherein the RAN transmits the power coordination configuration to the UE in a handover command message or a RRC container message.

10. The method of claim 8, wherein the DAPS procedure is a DAPS handover procedure or a DAPS primary secondary cell (PSCell) change procedure.

11. A base station configured to provide a power coordination configuration to a UE that performs a dual active protocol stack (DAPS) procedure in a radio access network (RAN), the base station comprising:
   a Radio Resource Control (RRC) controller; and
   a RAN interface,
   the RRC controller being configured:
      to determine that the UE is to perform the DAPS procedure for connecting to a target cell of the RAN and then disconnecting from a source cell of the RAN;

to transmit, to the UE via the RAN interface, a power coordination configuration to be applied by the UE thereby constraining an uplink power when communicating with the source cell and the target cell; and in response to receiving, from the UE, an information message about a failure while performing the DAPS procedure, cause the source cell to release the power coordination configuration.

12. A User Equipment (UE) configured to manage power according to a power coordination configuration when performing a dual active protocol stack (DAPS) procedure in a radio access network (RAN), the UE comprising:

a Radio Resource Control (RRC) controller; and a RAN interface, the RRC controller being configured to:

receive, from the radio access network (RAN) via the RAN interface, a power coordination configuration to be used by the UE during the DAPS procedure thereby constraining uplink power while communicating with a source cell and a target cell of the RAN;

initiate the DAPS procedure for connecting to the target cell and disconnecting from the source cell while applying the power coordination configuration; and in response to a detection of a failure when performing the DAPS procedure, release the power coordination configuration and disconnect from the source cell.

13. The UE of claim 12, wherein the failure includes the UE failing to connect to the target cell when performing the DAPS procedure.

14. The UE of claim 12, wherein the RRC controller is further configured to perform at least one of:

transmit, using the RAN interface and via the source cell, an indication that the UE failed to connect to the target cell; or re-establish a radio connection between the UE and the RAN.

15. The UE of claim 12, wherein the DAPS procedure is a DAPS handover procedure or a DAPS primary secondary cell (PSCell) change procedure.

16. The UE of claim 12, further comprising a computer-readable medium storing machine-readable instructions that, when executed by the RRC controller, cause the RRC controller to:

receive, from the RAN, the power coordination configuration for application by the UE to constrain the uplink power while communicating, via one or more RRC controllers, with the source cell and the target cell of the RAN;

initiate the dual active protocol stack (DAPS) procedure in accordance with the power coordination configuration; and in response to the detection of the failure when performing the DAPS procedure, release the power coordination configuration.

* * * * *